(12) United States Patent
Giamei et al.

(10) Patent No.: US 12,013,791 B2
(45) Date of Patent: Jun. 18, 2024

(54) RESET DYNAMIC ADDRESS TRANSLATION PROTECTION INSTRUCTION

(71) Applicant: INTERNATIONAL BUSINESS MACHINES CORPORATION, Armonk, NY (US)

(72) Inventors: Bruce Conrad Giamei, Lagrangeville, NY (US); Timothy Slegel, Staatsburg, NY (US); Christian Borntraeger, Stuttgart (DE); Damian Osisek, Vestal, NY (US); Lisa Cranton Heller, Rhinebeck, NY (US); Ute Gaertner, Schoenaich (DE); Christine Michele Yost, Hopewell Junction, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/335,224

(22) Filed: Jun. 1, 2021

(65) Prior Publication Data
US 2022/0382682 A1 Dec. 1, 2022

(51) Int. Cl.
*G06F 12/1027* (2016.01)
*G06F 12/02* (2006.01)
(Continued)

(52) U.S. Cl.
CPC ...... *G06F 12/1027* (2013.01); *G06F 12/0246* (2013.01); *G06F 12/0292* (2013.01); *G06F 12/0891* (2013.01); *G06F 12/1425* (2013.01)

(58) Field of Classification Search
CPC ............ G06F 12/1027; G06F 12/0246; G06F 12/0292; G06F 12/0891; G06F 12/1425; G06F 12/023
(Continued)

(56) References Cited

U.S. PATENT DOCUMENTS 4,787,041 A  11/1988  Yount
5,226,143 A  7/1993  Baird et al.
(Continued)

FOREIGN PATENT DOCUMENTS

CN  102713838 A  10/2012
DE  101 41 484 A1  3/2003
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Gautam Sain
*Assistant Examiner* — Wei Ma
(74) *Attorney, Agent, or Firm* — Edward Wixted, Esq.; Kevin P. Radigan, Esq.; Heslin Rothenberg Farley & Mesiti P.C.

(57) ABSTRACT

An instruction is provided to perform a reset address translation protection operation when executed. Executing the instruction includes determining, by a processor, that an address translation protection bit in a specified translation table entry associated with a storage block is to be reset. Based on determining that the address translation protection bit is to be reset, executing the instruction includes resetting the address translation protection bit to deactivate write
(Continued)

protection for the storage block. The resetting is absent waiting for an action by one or more other processors of the computing environment.

22 Claims, 18 Drawing Sheets

(51) Int. Cl.
  *G06F 12/0891* (2016.01)
  *G06F 12/14* (2006.01)
(58) Field of Classification Search
  USPC .......................................................... 711/154
  See application file for complete search history.

(56) References Cited

U.S. PATENT DOCUMENTS

| | | |
|---|---|---|
| 5,442,704 A | 8/1995 | Holtey |
| 5,835,954 A | 11/1998 | Duyanovich et al. |
| 6,765,826 B2 | 7/2004 | Kiehl et al. |
| 7,600,106 B2 | 10/2009 | Wang |
| 7,617,380 B2 | 11/2009 | So et al. |
| 8,140,823 B2 | 3/2012 | Corescu et al. |
| 8,156,280 B2 | 4/2012 | Kurosawa |
| 8,806,179 B2 | 8/2014 | Greiner et al. |
| 9,015,436 B2 | 4/2015 | Chee |
| 9,086,904 B2 | 7/2015 | Goggin et al. |
| 9,213,302 B2 | 12/2015 | Grisenthwaite et al. |
| 9,292,219 B2 | 3/2016 | Oiwa |
| 9,727,380 B2 | 8/2017 | Wang et al. |
| 9,760,410 B2 | 9/2017 | Robison |
| 10,372,352 B2 | 8/2019 | Mari et al. |
| 2007/0198979 A1 | 8/2007 | Dice et al. |
| 2007/0283108 A1* | 12/2007 | Isherwood .......... G06F 12/1009 711/E12.059 |
| 2010/0332721 A1* | 12/2010 | Yamada .............. G06F 12/1045 711/6 |
| 2011/0145511 A1* | 6/2011 | Woffinden .......... G06F 12/0808 711/159 |
| 2011/0145550 A1* | 6/2011 | Greiner .................... G06F 9/44 712/216 |
| 2012/0137079 A1 | 5/2012 | Ueda |
| 2012/0239904 A1* | 9/2012 | Ekanadham .......... G06F 9/3851 712/E9.016 |
| 2013/0339656 A1 | 12/2013 | Greiner et al. |
| 2014/0337585 A1* | 11/2014 | Grisenthwaite ..... G06F 12/1475 711/152 |
| 2016/0321186 A1* | 11/2016 | Deutschle .......... G06F 12/1009 |
| 2019/0026173 A1 | 1/2019 | Stephens |
| 2020/0097313 A1* | 3/2020 | Dong ...................... G06F 9/485 |

FOREIGN PATENT DOCUMENTS

| | | |
|---|---|---|
| TW | 323359 B | 12/1997 |
| TW | 201502780 A | 1/2015 |
| WO | WO 2021/064531 A1 | 4/2021 |

OTHER PUBLICATIONS

IBM Publication, "z/Architecture Principles of Operation," IBM® Publication No. SA22-7832-12, 13th Edition, Sep. 2019 (pp. 1-2000).
Yost et al., "Operating system Deactivation of Storage Block Write Protection Absent Quiescing of Processors", U.S. Appl. No. 17/335,232, filed Jun. 1, 2021 (74 pages).
Giamei et al., "List of IBM Patents and/or Patent Publications Treated as Related", U.S. Appl. No. 17/335,224, filed Jun. 1, 2021, dated Jun. 1, 2021 (2 pages).
International Search Report & Written Opinion for PCT Application No. PCT/EP2022/064836, dated Oct. 13, 2022 (15 pages) (Year: 2022).
Examination Report No. 1-6539060-0001, dated Apr. 18, 2024, 3 pages (Year: 2024).

* cited by examiner

EXECUTE AN INSTRUCTION TO PERFORM A RESET ADDRESS TRANSLATION PROTECTION OPERATION, THE EXECUTING THE INSTRUCTION INCLUDING: ~600

DETERMINING, BY A PROCESSOR, THAT AN ADDRESS TRANSLATION PROTECTION BIT IN A SPECIFIED TRANSLATION TABLE ENTRY ASSOCIATED WITH A STORAGE BLOCK IS TO BE RESET ~602

BASED ON THE DETERMINING, RESETTING THE ADDRESS TRANSLATION PROTECTION BIT TO DEACTIVATE WRITE PROTECTION FOR THE STORAGE BLOCK, THE RESETTING BEING ABSENT WAITING FOR AN ACTION BY ONE OR MORE OTHER PROCESSORS OF THE COMPUTING ENVIRONMENT ~604

THE EXECUTING THE INSTRUCTION FURTHER INCLUDES ENDING EXECUTING OF THE INSTRUCTION BASED ON RESETTING THE ADDRESS TRANSLATION PROTECTION BIT TO DEACTIVATE WRITE PROTECTION FOR THE STORAGE BLOCK ABSENT REQUIRING A QUIESCING OPERATION BY THE ONE OR MORE OTHER PROCESSORS OF THE COMPUTING ENVIRONMENT ~606

THE EXECUTING THE INSTRUCTION FURTHER INCLUDES CLEARING ANY TRANSLATION LOOKASIDE BUFFER ENTRIES IN THE PROCESSOR ASSOCIATED WITH THE SPECIFIED TRANSLATION TABLE ENTRY ~608

THE EXECUTING THE INSTRUCTION FURTHER INCLUDES RESETTING PROTECTION INDICATION IN ANY TRANSLATION LOOKASIDE BUFFER ENTRIES IN THE PROCESSOR ASSOCIATED WITH THE SPECIFIED TRANSLATION TABLE ENTRY ~610

THE EXECUTING THE INSTRUCTION FURTHER INCLUDES BROADCASTING A SIGNAL TO ONE OR MORE OTHER PROCESSORS OF THE COMPUTING ENVIRONMENT TO CLEAR OR MODIFY TRANSLATION LOOKASIDE BUFFER ENTRIES IN THE ONE OR MORE OTHER PROCESSORS ASSOCIATED WITH THE SPECIFIED TRANSLATION TABLE ENTRY ~612

THE EXECUTING THE INSTRUCTION FURTHER INCLUDES TESTING THE ADDRESS TRANSLATION PROTECTION BIT IN THE SPECIFIED TRANSLATION TABLE ENTRY ASSOCIATED WITH THE STORAGE BLOCK, WHERE THE BROADCASTING IS BASED AT LEAST IN PART, ON A RESULT OF THE TESTING ~614

FIG. 6A

ANOTHER PROCESSOR OF THE ONE OR MORE OTHER PROCESSORS ATTEMPTS A WRITE ACCESS TO THE STORAGE BLOCK WITHOUT THE OTHER PROCESSOR'S ASSOCIATED TRANSLATION LOOKASIDE BUFFER ENTRIES HAVING BEEN CLEARED OR MODIFIED, RESULTING IN AN ADDRESS TRANSLATION PROTECTION EXCEPTION CONDITION, AND BASED THEREON, THE OTHER PROCESSOR CAN INSPECT THE ADDRESS TRANSLATION PROTECTION BIT TO IDENTIFY THAT THE ADDRESS TRANSLATION PROTECTION EXCEPTION CONDITION IS AN OVER-INDICATION, AND BASED ON THE INSPECTION IDENTIFYING THAT THE ADDRESS TRANSLATION PROTECTION EXCEPTION CONDITION IS THE OVER-INDICATION, WRITE ACCESS TO THE STORAGE BLOCK IS PERMITTED ~616

ANOTHER PROCESSOR OF THE ONE OR MORE OTHER PROCESSORS ATTEMPTS A WRITE ACCESS TO THE STORAGE BLOCK WITHOUT THE OTHER PROCESSOR'S ASSOCIATED TRANSLATION LOOKASIDE BUFFER ENTRIES HAVING BEEN CLEARED OR MODIFIED, RESULTING IN AN ADDRESS TRANSLATION PROTECTION EXCEPTION CONDITION, AND BASED THEREON, THE OTHER PROCESSOR CAN INSPECT THE ADDRESS TRANSLATION PROTECTION BIT TO IDENTIFY THAT THE ADDRESS TRANSLATION PROTECTION EXCEPTION CONDITION IS AN OVER-INDICATION, AND BASED ON THE INSPECTION IDENTIFYING THAT THE ADDRESS TRANSLATION PROTECTION EXCEPTION CONDITION IS THE OVER-INDICATION, THE OTHER PROCESSOR CLEARS OR MODIFIES ITS ASSOCIATED TRANSLATION LOOKASIDE BUFFER OF ENTRIES CONTAINING THE OVER-INDICATED ADDRESS TRANSLATION PROTECTION BIT ~618

WHERE ANOTHER PROCESSOR OF THE ONE OR MORE OTHER PROCESSORS ATTEMPTS A WRITE ACCESS TO THE STORAGE BLOCK WITHOUT THE OTHER PROCESSOR'S ASSOCIATED TRANSLATION LOOKASIDE BUFFER ENTRIES HAVING BEEN CLEARED OR MODIFIED, RESULTING IN AN OVER-INDICATED ADDRESS TRANSLATION PROTECTION EXCEPTION CONDITION, AND BASED THEREON, REPORTS THE EXCEPTION CONDITION TO AN OPERATING SYSTEM OF THE COMPUTING ENVIRONMENT, BASED ON WHICH THE OPERATING SYSTEM ISSUES TO THE OTHER PROCESSOR THE INSTRUCTION TO PERFORM THE RESET ADDRESS TRANSLATION PROTECTION OPERATION AT THE OTHER PROCESSOR OF THE ONE OR MORE OTHER PROCESSORS ~620

FIG. 6B

RESET DYNAMIC ADDRESS TRANSLATION PROTECTION INSTRUCTION

BACKGROUND

One or more aspects relate, in general, to facilitating processing within a computing environment, and in particular, to improving such processing.

Computer architectures typically provide a mechanism for an operating system (OS) program to activate and deactivate write protection for blocks of storage. Memory management provided by the operating system in such a case can include, in one or more embodiments, a sequence of events, including the operating system activating write protection for a particular storage block, and an application program attempting to write to that particular storage block, causing the processor or central processing unit (CPU) to prevent the write and inform the operating system of the attempted write. The operating system responds by performing appropriate memory management processes and deactivating write protection for that particular storage block. The application program repeats the attempt to write to the particular storage block, and is now permitted to perform the operation.

When the operating system changes the write permission for a storage block, all processors in the computing environment are informed, via a broadcast operation, and each performs actions to ensure the change is observed locally. The process of broadcasting and serialization required among all processors in the computing environment is referred to as a quiescing operation. As part of the quiescing operation, each processor must reach an interruptible point, perform any actions needed locally (e.g., remove any now obsolete translation lookaside buffer (TLB) data) to guarantee the change is observable, and respond to the initiating processor that it has done so. Any instruction processing which may rely on the updated permission is suspended until after all processors in the configuration have indicated their responses and the initiator has made the system-wide update to the write permission for the specified storage block.

The described sequence of events can occur during frequent memory management operations, such as copy-on-write and change-tracking. The more processors in the computing environment, the longer it takes to perform the quiescing operation.

SUMMARY

Certain shortcomings of the prior art are overcome, and additional advantages are provided through the provision of a computer program product for facilitating processing within a computing environment. The computer program product includes at least one computer-readable storage medium having program instructions embodied therewith. The program instructions are readable by a processor to cause the processor to perform a method including executing an instruction to perform a reset address translation protection operation. Executing the instruction includes determining by the processor, that an address translation protection bit in a specified translation table entry associated with a storage block is to be reset, and based on determining, resetting the address translation protection bit to deactivate write protection for the storage block. The resetting is absent waiting for an action by one or more other processors of the computing environment. By resetting without waiting for an action by the other processors of the computing environment, performance is enhanced using the instruction.

In one or more embodiments, executing the instruction includes ending execution of the instruction based on resetting the address translation protection bit to deactivate write protection for the storage block absent requiring a quiescing operation by the one or more other processors of the computing environment. Note that a quiescing operation in this context typically requires serialization among all processors in the computing environment. Since the quiescing operation is avoided, serialization among the processors is not required in order for write protection for the storage block to be deactivated using the instruction. This results in reduced suspension of instruction processing by the other processors of the computing environment, and thereby enhances performance. In addition, it reduces contention for the quiesce serialization mechanism in the system. The instruction provides the operating system with an option to deactivate write protection for a storage block without requiring serialization among all the processors of the computing environment to respond to the change. Further, the instruction to perform the reset address translation protection operation is a single instruction performing the determining and the resetting operations, which improves performance, and reduces utilization of resources. By providing a single instruction to perform the determining and the resetting operations, certain tasks can be performed more efficiently than using a software paradigm. The determining and the resetting operations are performed faster, reducing executing time, and improving processor and overall system performance.

In one example, executing the instruction further includes clearing any translation lookaside buffer entries in the processor associated with the translation table entry. In another example, executing the instruction further includes resetting protection indication in any translation lookaside buffer entries in the processor associated with the specified translation table entry. Advantageously, rather than clearing the translation lookaside buffer entries, the processor can simply reset the protection indication in the entries, while leaving the remainder of the entries intact. This allows writes to continue to complete without requiring retranslation of the address to reconstruct the required translation lookaside buffer entry.

In one or more implementations, executing the instruction further includes broadcasting a signal to one or more other processors of the computing environment to clear or modify translation lookaside buffer entries in the one or more other processors associated with the specified translation table entry. In one example, executing the instruction further includes testing the address translation protection bit in the specified translation table entry associated with the storage block, where the broadcasting is based, at least in part, on a result of the testing. By using the reset address translation protection instruction to perform the determining, resetting and broadcasting operations, performance is improved, and utilization of resources is reduced.

In one or more embodiments, another processor of the one or more other processors of the computing environment attempts a write access to the storage block without the other processor's associated translation lookaside buffer entries having been cleared or modified, resulting in an address translation protection exception condition. Based on the address translation protection exception condition, the other processor inspects the address translation protection bit to identify that the address translation protection exception condition is an over-indication, and based on the inspection identifying that the address translation protection exception condition is the over-indication, write access to the storage block is permitted. Inspecting the address translation protection bit to identify that the address translation protection exception condition is an over-indication advantageously improves processing performance in this situation by allowing access, and avoiding a need for the program interrupt handler of the operating system.

In one or more embodiments, another processor of the one or more other processors of the computing environment attempts a write access to the storage block without the other processor's associated translation lookaside buffer entries having been cleared or modified, resulting in an address translation protection exception condition. Based on the address translation protection exception condition, the other processor inspects the address translation protection bit to identify that the address translation protection exception condition is an over-indication, and based on the inspection identifying that the address translation protection exception condition is the over-indication, the other processor clears or modifies its associated translation lookaside buffer entries containing the over-indicated address translation protection bit. Advantageously, inspecting the address translation protection bit to identify that the address translation protection exception condition is an over-indication improves processing performance in this situation by allowing the write access to proceed.

In one or more embodiments, another processor of the one or more other processors attempts a write access to the storage block without the other processor's associated translation lookaside buffer entries having been cleared, resulting in an address translation protection exception condition, and based thereon, reports the exception condition to an operating system of the computing environment. Based on reporting the exception condition, the operating system issues to the other processor the instruction to perform the reset address translation protection operation at the other processor of the one or more other processors. Advantageously, the instruction to perform the reset address translation protection operation provides an option for the operating system to facilitate deactivating write protection for the storage block without requiring a quiescing operation among all processors of the computing environment responsive to the change.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 6A-6B depict one example of facilitating processing within a computing environment, in accordance with one or more aspects of the present invention;

DETAILED DESCRIPTION

Figure 1A:
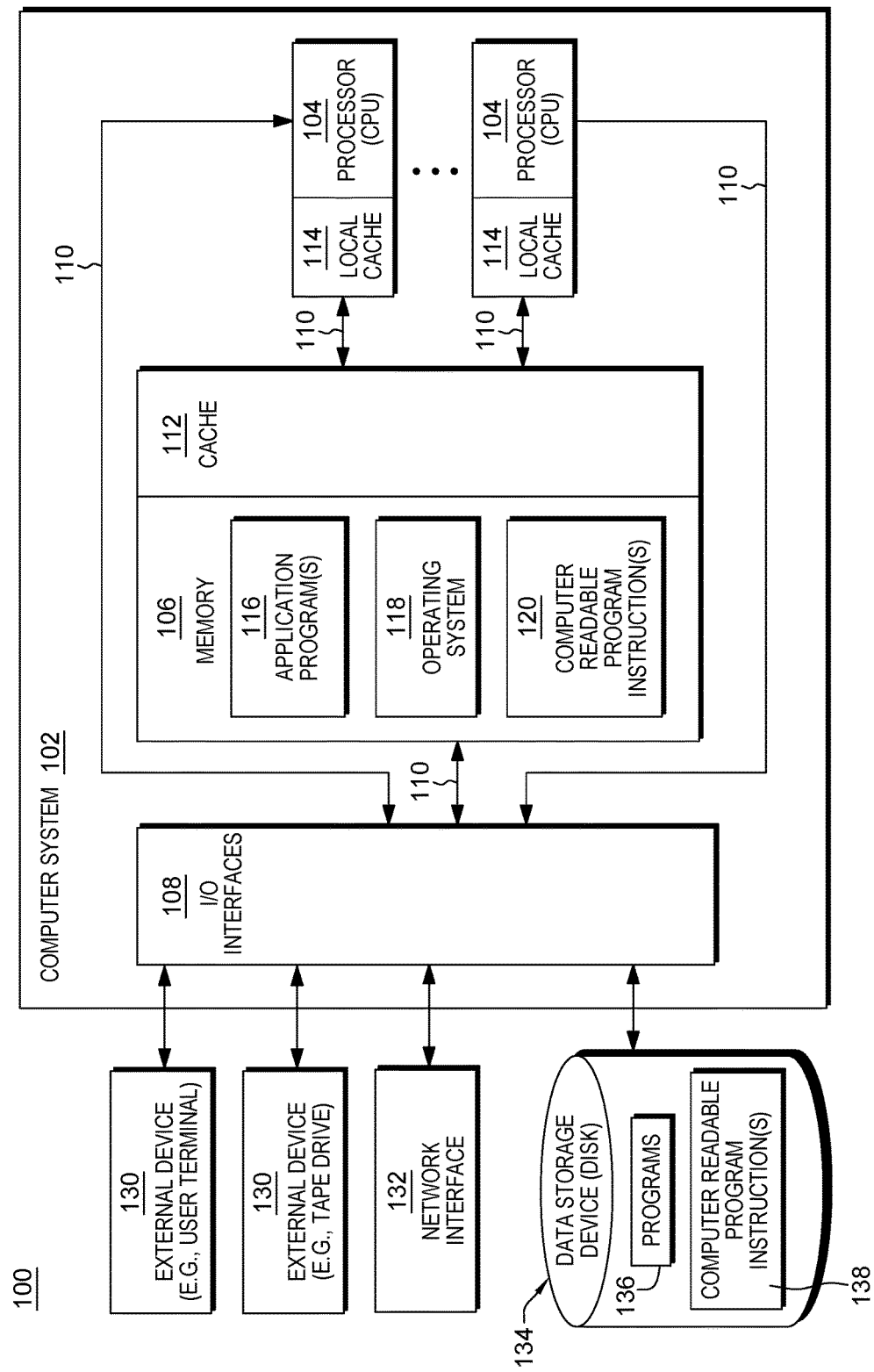
FIG. 1A depicts one example of a computing environment to incorporate and use one or more aspects of the present invention.

In accordance with an aspect of the present invention, a capability is provided to facilitate processing within a computing environment. As one example, a single instruction (e.g., a single architected machine instruction at the central processing unit/software interface) is provided to perform a reset operation. The instruction, referred to herein as a reset dynamic address translation protection instruction, or reset address translation protection instruction, is part of a general-purpose processor instruction set architecture (ISA), which is dispatched by a program on a processor, such as a general-purpose processor. (In another example, the instruction may be part of a special-purpose processor, such as a co-processor configured for certain functions.)

As part of execution of the single instruction (e.g., the Reset Dynamic Address Translation Protection instruction), various operations are performed including determining, by the processor, that an address translation protection bit in a specified translation table entry associated with a storage block is to be reset, and based on the determining, resetting the address translation protection bit to deactivate write protection for the storage block, where the resetting operation, and instruction execution, are independent of any associated operations of one or more other processors of the computing environment, such as absent, or without, requiring a quiescing operation by the one or more other processors of the computing environment to reset write protection for the storage block in the processor. Each of these operations is performed as part of executing the single instruction, improving system performance, and reducing use of system resources.

As noted, computing environments, or computer architectures, typically provide a process or sequence of events for an operating system (OS) program to selectively activate and/or deactivate write protection for one or more blocks of storage. Memory management provided by the operating system typically includes the following sequence of events: 1) the operating system activates write protection for a particular storage block; 2) an application program attempts to write to that particular storage block, causing the processor or central processing unit (CPU) to inform the OS of the attempted write access; 3) the OS performs appropriate memory management reaction processing, and deactivates write protection for that particular storage block; and 4) the application program repeats the attempt to write the particular storage block, and is now permitted to perform the operation.

When the OS changes the write permission for a storage block, all processors in the computing configuration or environment are conventionally informed and perform associated actions to ensure the change is adhered to. The process of broadcasting and serialization required for such a change is referred to as a quiescing operation among the processors in the computing environment. As part of the quiescing operation, subsequent to each processor reacting to the change, each processor suspends instruction processing until after all processors in the computing configuration have indicated reactions that have completed.

The described sequence of events occurs during frequent memory management operations, such as copy-on-write and change-tracking. Further, the more processors or CPUs in the computing environment, the longer it takes to perform the quiescing operation. Therefore, eliminating the quiesce operation reduces the amount of time required for the computing configuration to react to this common change to write permission, improves the performance of these operations, and thus facilitates processing within the computing environment. In addition, due to the serialization requirements of the quiescing hardware, these resources are limited in the system. Eliminating the need for quiescing in this case, also reduces the system-wide constraints experienced by this hardware.

Advantageously, the reset address translation protection instruction disclosed herein provides an option for the OS to deactivate write protection for a storage block, with no requirement for serialization among the processors or CPUs as part of the computing configuration response to the change. The change is applied to the processor which executes the instruction to deactivate the write protection (i.e., information based on the prior (protection-enabled) table entry is cleared from the translation lookaside buffer (TLB) of the processor), and the change may or may not be applied to one or more other processors, such as to all other processors, in the computing configuration. When the OS elects to use the reset address translation protection instruction operation, the OS knows of the possibility that another processor may continue to report write protection violations for the particular storage block, i.e., address translation protection exception conditions. In such cases, the OS recognizes the over-indication and can deactivate write protection for the storage block on the processor that indicated the violation (by clearing or modifying the TLB of this (second) processor). In one or more embodiments, the OS can use the reset address translation protection instruction provided herein when, for instance, it is unlikely other processors in the computing configuration are also accessing the particular storage block. Since serialization among processors is not required in execution of the reset address translation protection operation, suspension of instruction processing by the other processors in the computing environment is reduced. As a result, performance is improved.

One embodiment of a computing environment to incorporate and use one or more aspects of the present invention is described with reference to FIG. 1A. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Memory 106 may include, for instance, a cache 112, such as a shared cache, which may be coupled to local caches 114 of processors 104. Further, memory 106 may include one or more programs or applications 116 and at least one operating system 118. An example operating system includes a z/OS® operating system, offered by International Business Machines Corporation, Armonk, New York z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Computer system 102 can communicate via, e.g., I/O interfaces 108 (e.g., peripheral component interconnect (PCI), and/or other I/O interface connections) with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
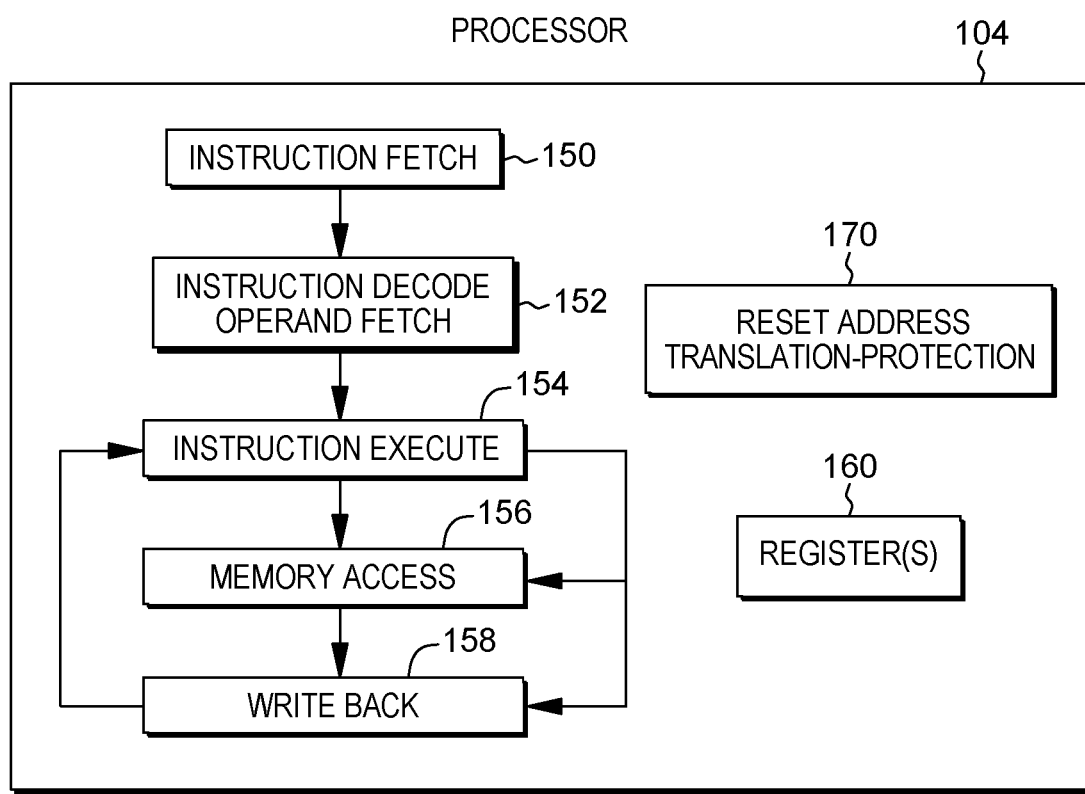
FIG. 1B depicts further details of a processor of FIG. 1A, in accordance with one or more aspects of the present invention.

In one example, a processor (e.g., processor 104) includes a plurality of functional components used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing a reset operation of, e.g., a Reset Dynamic Address Translation Protection instruction (or other processing that may use one or more aspects of the present invention), as described herein. The one or more other components include, for instance, a reset address translation protection component (or one or more other components) 170.

The computing environments described herein support architectural functions, such as dynamic address translation (DAT). With appropriate support by an operating system, the dynamic address translation facility can be used to provide to a user a system in which storage appears to be larger than the main storage (a.k.a., main memory) which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing environments, the interpretive execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment can call for application of DAT multiple times: first at the guest level, to translate a guest virtual address through guest managed translation tables into a guest non-virtual address, and then, for a pageable guest, at the host level, to translate the corresponding host virtual address (i.e., guest non-virtual address) to a host a non-virtual address, such as a host real or absolute address.

A sequence of virtual addresses associated with virtual storage is called an address space, and the dynamic address translation facility can be used to provide a number of address spaces. These address spaces can be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation can be specified for instruction and data addresses generated by the CPU. The real or absolute address that is formed by dynamic address translation, and the absolute address that is then formed by prefixing, in one embodiment, are 64 bits in length. The virtual address can be a primary virtual address, a secondary virtual address, an access register (AR)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

Figure 2A:
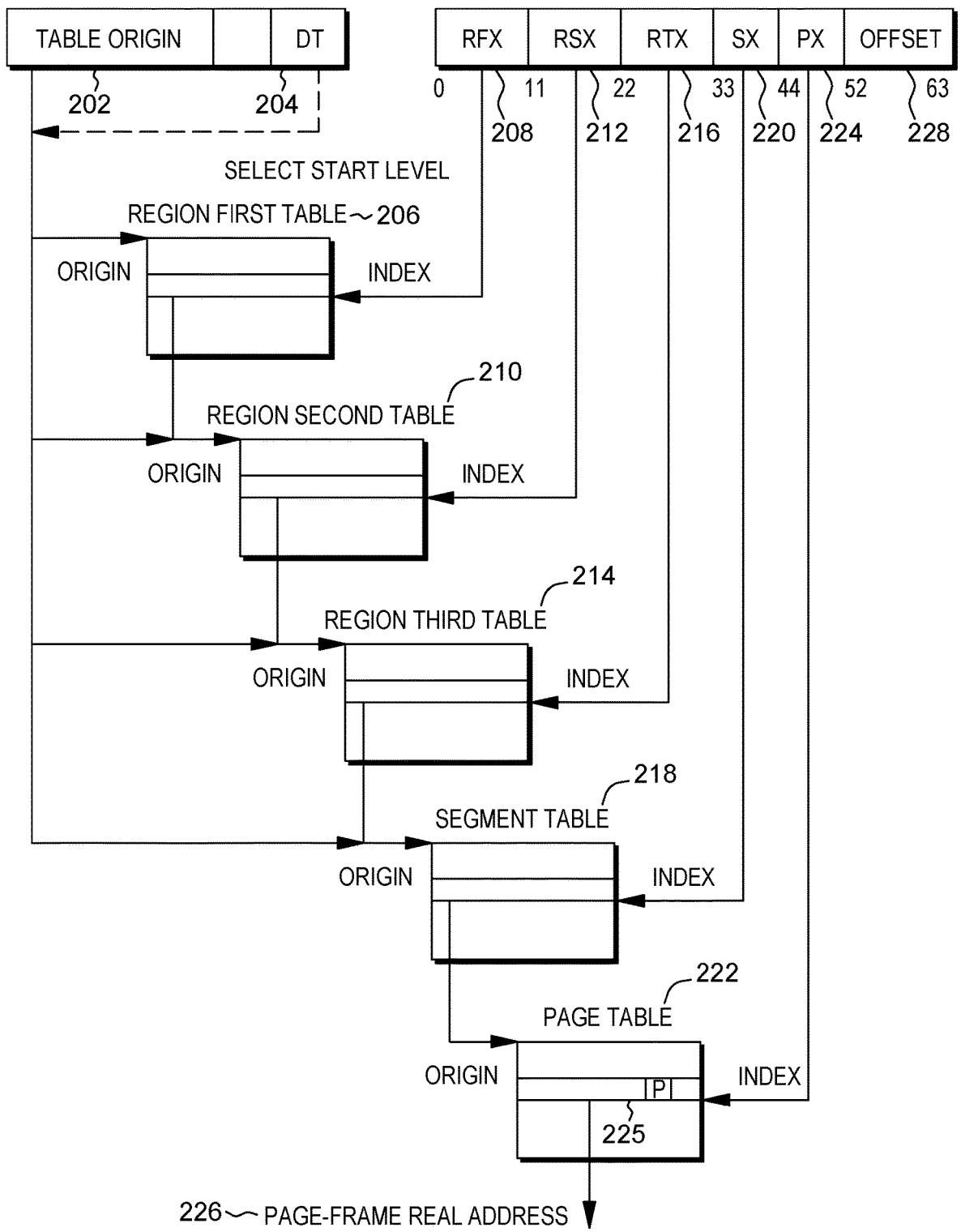
FIG. 2A depicts one example of address translation, and an address translation protection bit to be reset, in accordance with one or more aspects of the present invention.

One example of translating a virtual address to a real address is described with reference to FIG. 2A. This process is referred to herein as a DAT walk (or a page walk) in which the address translation tables are walked to translate one address (e.g., a virtual address) to another address (e.g., a real address). In this example, an address space control element (ASCE) 200 includes a table origin 202, as well as a designation type (DT) control 204, which is an indication of a start level for translation (i.e., an indication at which level in the hierarchy address translation is to begin). Using table origin 202 and DT 204, the origin of a particular table is located. Then, based on the table, bits of the virtual address are used to index into the specific table to obtain the origin of the next level table. For instance, if the region first table (RFT) 206 is selected, then bits 0-10 (RFX) 208 of the virtual address are used to index into the region first table to obtain an origin of a region second table (RST) 210. Then, bits 11-21 (RSX) 212 of the virtual address are used to index into region second table 210 to obtain an origin of a region third table (RTT) 214. Similarly, bits 22-32 (RTX) 216 of the virtual address are used to index into region third table 214 to obtain an origin of a segment table 218. Then, bits 33-43 (SX) 220 of the virtual address are used to index into segment table 218 to obtain an origin of page table 222, and bits 44-51 (PX) 224 of the virtual address are used to index into page table 222 to obtain a page table entry (PTE) 225 having a page frame real address (PFRA) 226. The page frame real address is then combined (e.g., concatenated) with offset 228 (bits 52-63) to obtain a real address. Prefixing may then be applied to obtain the corresponding absolute address.

In one embodiment, one or more of the translation table entries, such as page table 222, includes an address translation protection bit P which can be used to control write access to the storage block or blocks associated with the translation table entry. When the bit is a first value, for instance, "0", write protection for the storage block is deactivated, and when the bit is a second value, for instance, "1", write protection for the storage block is activated. For instance, when set, the address translation protection bit indicates that address translation protection applies to, for example, the particular page in the context of page table entries. (For segment table entries, the address translation protection bit controls whether write accesses can be made to the entire segment.) In one embodiment, the bit has no effect on fetch accesses, only write accesses. If the protection bit is '0', write accesses are permitted, and if the bit is '1', write accesses are disallowed (i.e., in one embodiment).

Figure 2B:
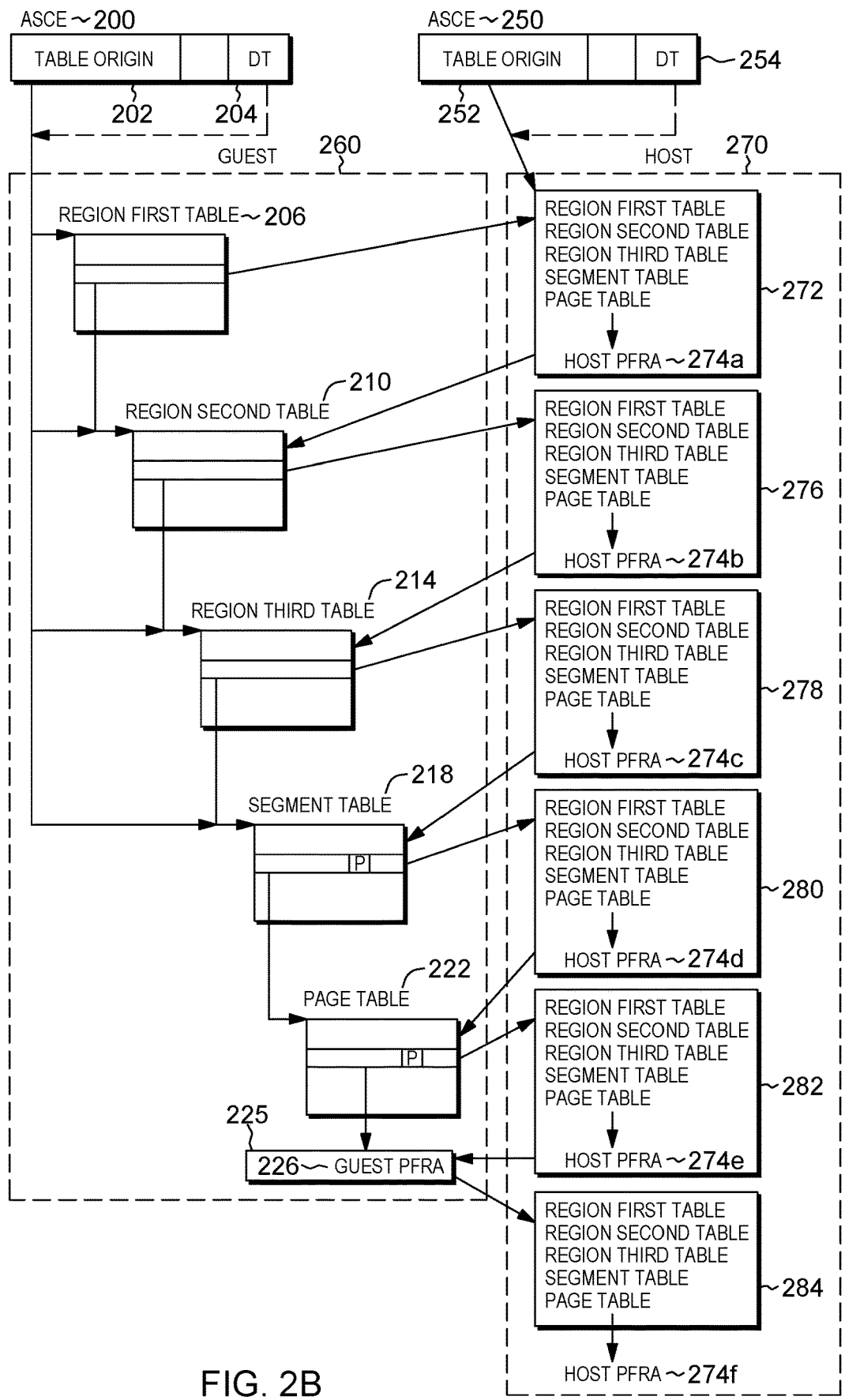
FIG. 2B depicts another example of address translation, and an address translation protection bit to be reset, in accordance with one or more aspects of the present invention.

Another example of address translation is described with reference to FIG. 2B. In this example, a DAT walk is performed to translate an initial guest virtual address to a final host real address. In this example, address space control element (ASCE) 200 is a guest address space control element, and DT 204 of ASCE 200 indicates that guest translation determined by guest address translation structures 260 is to start at region first table 206 pointed to by table origin 202. Thus, the appropriate bits of the initial guest virtual address (e.g., RFX 208) are used to index into region first table 206 to obtain a pointer of an entry of the region first table. The address of the region first table entry (RFTE) is a guest real or absolute address. This guest real or absolute address, with the main storage origin and limit applied, corresponds to a host virtual address. This intermediate host virtual address is then translated using host address translation structures 270. In particular, address space control element (ASCE) 250 is a host address space control element used to indicate a start level for translation in host address translation structures 272. Based on the start level (e.g., region first table) indicated by DT 254 of ASCE 250, the particular bits of the host virtual address are used to index into the indicated table with table origin 252 to be used for translation using host address translation structure 272, as described with reference to FIG. 2A. The translation of the host virtual address corresponding to the guest RFTE continues until a host page frame real address (PFRA) 274a is obtained.

Data at the intermediate host page frame real address is a pointer to the next level of guest address translation structures (e.g., guest region second table 210, in this particular example), and translation continues, as described above. Specifically, host address translation structures 276, 278, 280 and 282 are used to translate the intermediate host virtual addresses associated with the guest region second table 210, region third table 214, segment table 218 and page table 222, respectively, resulting in host PFRAs 274b, 274c, 274d and 274e, respectively. Host page frame real address 274e includes the address of a guest page table entry 225. Guest page table entry 225 includes a guest page frame real address 226, which is concatenated with the offset from the initial guest virtual address to obtain the corresponding guest absolute address. The main storage origin and limit are then applied to calculate the corresponding host virtual address, which is then translated, as described above, using address translation structures 284 to obtain host page frame real address 274f. The host page frame real address is then combined (e.g., concatenated) with the offset (e.g., bits 52-63) of the host virtual address to obtain the final host real address. This completes translation of a guest virtual address to a host real address.

Although in the above examples translation starts at the region first table, this is only one example. Translation can start at any region or segment table level for either the guest or the host. Further, note that, as part of one or more of the translation table entries, such as for the region second table, region third table, segment table, page table, an address translation protection bit P can be included in the table entry and referenced during processing of a write access to an associated storage block or blocks to determine whether the write access is allowed to proceed. When the address translation protection bit is a first value (e.g., '0'), the write access to the storage block or blocks is allowed, and when the address translation protection bit is a second value (e.g., '1'), then write protection for the storage block or blocks is active, and the write access is prevented.

Further, in one embodiment, to improve address translation, a virtual address to real or absolute address translation mapping can be stored in an entry of a structure associated with address translation, such as a translation lookaside buffer (TLB). The TLB is a cache used by the memory management hardware to improve virtual address translation speed. The next time translation for a virtual address is requested, the TLB will be checked and if a corresponding entry resided in the TLB, there is a TLB hit and the real or absolute address is retrieved therefrom. Otherwise, a page walk is performed, as described above.

Figure 2C:
FIG. 2C depicts one embodiment of an address translation lookaside buffer, in accordance with one or more aspects of the present invention.

In one example, as depicted in FIG. 2C, a translation lookaside buffer 290 may include one or more entries 292. Any given translation lookaside buffer entry can include an address translation protection bit P 296, which can be used to control write access to the storage block or blocks associated with the translation table entry, such as described herein. Further, a TLB entry may be associated with a region table entry, a segment table entry, or a page table entry of the address translation tables. In one or more embodiments, region table entries and segment table entries can also have protection bits, in addition to the address translation protection bit P in a page table entry. In the translation lookaside buffer, all of the address translation protection bits P would be ORed, to transition from the guest (or virtual) address to the real address. An entry may be for a host or for a guest (or both) of the computing environment, and may be marked as such with an indicator (e.g., H/G indicator 294). For instance, if H/G 294 is set to one, then it is a host entry, and if set to zero, it is a guest entry, or vice versa. In some embodiments, both guest and host level translations are performed in turn, each proceeding through these table levels for both guest and host levels, and the protection bits from all guest and host level table entries are ORed to form the protection bit in a composite translation lookaside buffer entry. Many implementations of a translation lookaside buffer are possible.

As indicated, guest translations can be included in the TLB. These entries may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 272, 276, 278, 280 and 282, as well as the final host translation 284, as described in FIG. 2B above. In another example, a hierarchical TLB may contain an entry in a first level of the TLB which buffers a translation from the initial guest virtual address down to the associated origin of the guest page table 222. This first level entry represents, for instance, a combined region and segment table entry (CRSTE) and may be referred to as the CRSTE portion of the TLB. Further, the hierarchical TLB may contain a separate entry from a second level of the TLB which buffers the translation from the guest page table entry address down to the final host real or absolute address. In this example, guest entries in the first level of the TLB implicitly include intermediate host translations 272, 276, 278 and 280 which correspond to the host translations which back guest region and segment tables, and guest entries in the second level implicitly include intermediate host translation 282 which backs the guest page table and final host translation 284, as described in FIG. 2B. Many implementations of a translation lookaside buffer are possible.

In accordance with an aspect of the present invention, an instruction, referred to herein as a Reset Dynamic Address Translation Protection instruction, reset DAT protection instruction or reset address translation protection instruction, is provided to perform, as part of executing the single instruction, determining, by the processor or CPU executing the instruction, that an address translation protection bit in a specified translation table entry associated with a storage block is to be reset, and based on determining that the protection bit is to be reset, resetting the address translation protection bit to deactivate write protection for the storage block. The resetting is without, or absent, requiring a quiescing operation by other processors of the computing environment. In one or more embodiments, executing the instruction is based on an attempted write access to the storage block, with the write access being blocked by the address translation protection bit in the specified translation table entry prior to executing the instruction. Further, executing the instruction can include ending execution of the instruction based on resetting the address translation protection bit to deactivate write protection for the storage block without waiting for any associated action by one or more other processors of the computing environment. In this manner, the processor executing the reset address translation protection instruction proceeds independent of any associated processing at one or more other processors of the computing environment.

An operating system can activate and/or deactivate address translation protection exceptions for one or more blocks of storage as part of, for instance, copy-on-write operations or change-tracking to particular storage locations. As noted, the address translation protection bit of the applicable translation table entries specifies when address translation protection exception conditions exist. Existing methods of modifying the address translation protection typically involve a quiescing operation involving all other processors in the computing environment. As explained, in one or more embodiments, a reset address translation protection instruction is provided herein, the execution of which provides a mechanism to clear the address translation protection bit of a translation table entry, clear or modify local copies of associated TLB entries, and optionally broadcast the change to other CPUs in the configuration, when appropriate, without requiring the serializing aspect of a quiescing operation. The reset address translation protection operation disclosed thus provides performance enhancements compared with the typical approach of requiring quiescing among the processors of the computing environment for the resetting operation to proceed, and complete. In addition, the reset address translation protection operation disclosed prevents the consumption of limited, system-wide quiescing resources, allowing the resources to be available for use for other operations.

As noted, the address translation protection bit (e.g., DAT-protection bit) of the designated translation table entry is set to zero, or verified to be zero, as part of the reset dynamic address translation protection instruction execution. Further, associated translation lookaside buffer entries in the processor or CPU which executes the instruction are cleared or modified. When the local clearing control is zero, associated translation lookaside buffer entries in other processors in the computing environment may or may not be cleared or modified asynchronously to the execution of the instruction. Note that, in one embodiment, associated translation lookaside buffers in the processor which executes the reset instruction are cleared or modified, even where the designated address translation protection bit is not active at the beginning of instruction execution.

One embodiment of a Reset Dynamic Address Translation Protection instruction used to perform a reset operation is described below with reference to FIGS. 3A-3E. The instruction is executed, in one example, using a general-purpose processor (e.g., processor 104 of FIG. 1A). In the description herein, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

Figure 3A:
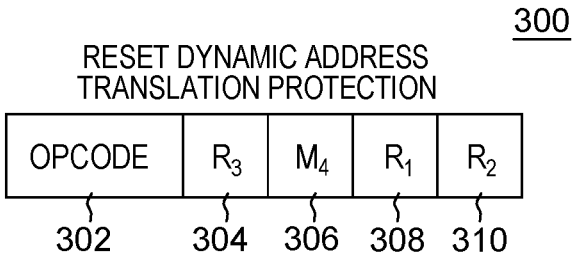
FIGS. 3A-3E depict one example of a format of a Reset Dynamic Address Translation Protection instruction, in accordance with one or more aspects of the present invention.

In one example, the Reset Dynamic Address Translation Protection instruction has a format that denotes a register and register operation with an extended operation code (opcode) and an additional register. As shown in FIG. 3A, in one example, a Reset Dynamic Address Translation Protection instruction 300 has a plurality of fields, and a field may have a subscript number associated therewith. The subscript number associated with a field of the instruction denotes the operand to which the field applies. For instance, the subscript number 1 associated with register $R_1$ denotes that the register specified using $R_1$ includes the first operand, and so forth. A register operand is one register in length, which is, for instance, 64 bits.

In one embodiment, Reset Dynamic Address Translation Protection (RDP) instruction 300 includes operation code (opcode) field 302 (e.g., bits 09-15) indicating a reset operation; a first register ($R_1$) field 308 (e.g., bits 24-27) used to designate at least one first register; a second register ($R_2$) field 310 (e.g., bits 28-31) used to designate at least one second register; a third register ($R_3$) field 304 (e.g., bits 16-19) used to designate at least one third register; and a mask ($M_4$) field 306 (e.g., bits 20-23), each of which is described below. In one embodiment, the fields are separate and independent from one another; however, in other embodiments, more than one field may be combined. Further information regarding these fields is described below.

Figure 3B:

In one embodiment, register ($R_1$) field 308 contains contents which have the format of a segment-table entry, with only the page-table origin used, as illustrated in FIG. 3B.

Figure 3C:
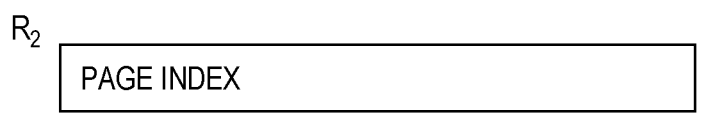

In one example, register ($R_2$) field 310 can have the format of a virtual address, with only the page index being used, as illustrated in FIG. 3C.

Figure 3D:

In one or more embodiments, register ($R_3$) field 304 of the reset instruction has the format of an address-space-control element (ASCE), with only the table origin and the designation-type control (DT) being used. FIG. 3D illustrates an example of this, where register ($R_3$) field 304 includes a region-table or segment-table origin of the ASCE used for clearing. These contents can be used to further select the translation lookaside buffer entries to be cleared or modified. If the $R_3$ field of the instruction is zero, then the entire contents of $R_3$ are ignored, and translation lookaside buffer entries are cleared, regardless of the ASCE used to form them.

Figure 3E:
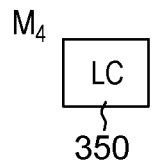

In one example, one or more controls are used in executing the instruction. Example controls are included in $M_4$ field 306. Referring to FIG. 3E, $M_4$ field 306 includes (in one embodiment) a local-clearing control (LC) bit, which when set, indicates that associated translation lookaside buffer entries only in the local processor or CPU are cleared or modified, and when not set, in addition to clearing associated translation lookaside buffer entries in the local processor, associated translation lookaside buffer entries in all processors of the computing environment or computer configuration may or may not be cleared or modified.

In one or more specific embodiments, the page table origin and the page index designate a page table entry, following the dynamic-address translation rules for page-table lookup. In a z/Architecture® architectural mode, the page-table origin is treated as a 64-bit address, and the addition is performed by using the rules for 64-bit address arithmetic, regardless of the current addressing mode. The address formed from these two components is a real or absolute address.

During this procedure, the page-table entry need not be inspected for format errors, and the page-frame real address contained in the entry need not be checked for an addressing exception. Additionally, the address translation protection (or DAT-protection) bit is set to zero (or verified to be zero), regardless of the value of the page-invalid bit.

The entire page-table entry appears to be fetched concurrently from storage, as observed by other processors. The DAT-protection bit is examined. When the DAT-protection bit is '1' at the beginning of the instruction, the byte containing the DAT-protection bit is stored. When the DAT-protection bit is '0' at the beginning of the instruction, it is model-dependent, whether the byte containing the DAT-protection bit is stored.

If no exceptions are recognized, then the processor clears selected entries from its translation lookaside buffer. Then, if the LC bit is zero, the processor can signal all processors in the configuration to clear or modify selected entries from their translation lookaside buffers when convenient and without performing a quiescing operation. When a translation lookaside buffer is affected, the translation lookaside buffer is cleared of at least those entries for which the following conditions are met: 1) the page-table origin in general register $R_1$ matches the page-table origin used to form the TLB table entry; 2) the page index in general register $R_2$ matches the page index in the TLB table entry; 3) the $R_3$ field is zero or the table-origin and designation-type fields in general register $R_3$ match the table-origin and designation-type fields in the address-space-control element (ASCE) used to form the TLB table entry; and 4) the page-frame real address (PFRA) contained in the designated page-table entry matches the PFRA used to form the TLB table entry.

In one or more embodiments, a serialization function is performed on the processor executing the instruction before the reset operation begins, and again after the operation is completed. As is the case for all serialization operation, this serialization applies only to the processor executing the reset address translation protection instruction. Advantageously, other processors need not be serialized or quiesced to perform the instruction disclosed herein.

As explained below, subsequent to executing the reset address translation protection instruction, other processors in the configuration can continue to recognize an address translation protection exception for the page (i.e., storage block) corresponding to the page-table entry modified by the instruction. In this case, translation lookaside buffer entries corresponding to the modified page-table entry have not yet been cleared or modified for the processors which did not execute the instruction. Furthermore, in this case, the processor which did not execute the instruction can observe the address translation-protection bit of the modified page-table entry being zero. The operating system or control program operating in the computing environment is aware of and handles the potential scenario, as described further below with reference to FIGS. 4A-5C.

To improve performance further, other processors in the computing environment can minimize cases of presenting unnecessary address translation-protection exceptions to the operating system in the event an associated translation lookaside buffer entry has not yet been cleared or modified. For instance, prior to presenting a DAT-protection exception, the processor can examine the contents of the DAT-protection bit of the translation-table entry. If this bit is found to be zero, then the processor can discard the protection exception condition, clear or modify its local TLB of entries that contain the outdated protection indication, and re-execute the instruction that triggered the exception. Further, on the processor which executed the RDP instruction, when the DAT-protection bit of the specified page-table entry is zero at the beginning of the instruction, it is unnecessary to signal other processors in the computing environment of the operation since the processor is not making a change, and if a prior processor had made a change, it would already have broadcast a signal where appropriate. Further, proper operation is ensured even absent further broadcasting of a signal, since any other processor will either recognize and handle the over-indication as discussed herein, or present the exception, causing the operating system to issue another RDP on that processor.

As noted, in another embodiment, instead of clearing the TLB of entries with the protection indication, the processor can modify or alter the TLB entries in-place to disable protection. Advantageously, this obviates performing another page walk to reconstruct the entry when the instruction is re-executed.

Note that, in one or more embodiments the reset address translation protection instruction can apply to page-table entries. In one or more other embodiments, the reset address translation protection instruction can apply to segment-table or region-table entries, as well as to page-table entries.

Note also that, although various fields and registers of the Reset Dynamic Address Translation Protection instruction are described, one or more aspects of the present invention may use other, additional and/or fewer fields and/or registers, and/or other sizes of fields and/or registers, etc. Many variations are possible. For instance, implied registers can be used instead of explicitly specified registers and/or fields of the instruction and/or explicitly specified registers and/or fields can be used instead of implied registers and/or fields. Other variations are also possible.

As noted herein, the address translation protection bit (e.g., DAT-protection bit) can be provided in address translation table entries as a means or mechanism for an operating system to activate and deactivate write protection for storage blocks. To activate write protection, the operating system sets the address translation protection bit to '1' in a translation table entry used during an attempted write access to the storage block of interest. To deactivate write protection, the operating system sets the same address translation protection bit to zero. In certain implementations, the computing environment (e.g., IBM z/Architecture®) can provide the address translation-protection program exception as a mechanism for the computing environment to inform the operating system that an application program attempted to write to a storage block having a corresponding translation table entry (TTE) preventing write access. As noted, to enhance performance, the computing environment processors can implement translation-lookaside buffers (TLBs). Information associated with address translations can be retained in TLB entries. Such information can include contents of translation table entries used during an address translation, such as the address translation protection bit. When an address translation is required as part of executing an instruction, the processor can use TLB entries, if available, in place of processing translation table entries, since using the TLB saves the processor time.

The computing architecture (such as IBM z/Architecture®) can provide instructions for the operating system to modify contents of translation table entries in a manner that provides consistent results among all processors in the computing configuration. To date, changes to translation table entries include clearing associated TLB entries in the processors in the computing configuration, and performing a quiescing operation.

As noted, in one or more aspects, a reset dynamic address translation (DAT)-protection instruction (or RDP instruction) is provided herein. The RDP instruction provides the option for the operating system to set the address translation-protect bit (e.g., DAT-protect bit) of a translation table entry to zero (deactivating write protection) for a storage block with no requirement for broadcasting or serialization (that is, no requirement for a quiescing operation) among all the processors as part of the computing environment response to the change. The processor executing the reset address translation protection instruction can test the address translation protection bit in the specified translation table entry. If the address translation protection bit is '1', then it is changed to zero. Regardless of the value at the beginning of execution of the instruction, associated TLB entries, if any, are cleared or modified in the processor executing the reset address translation protection instruction. When the local clearing option is not specified, the processor executing the reset address translation protection instruction can broadcast a signal to all other processors in the computing environment to clear or modify associated TLB entries in the other processors, and can indicate instruction completion without waiting for TLB clearing or modifying by all the processors. Advantageously, a quiescing operation need not be performed during execution of the reset address translation protection instruction.

Figure 4A:
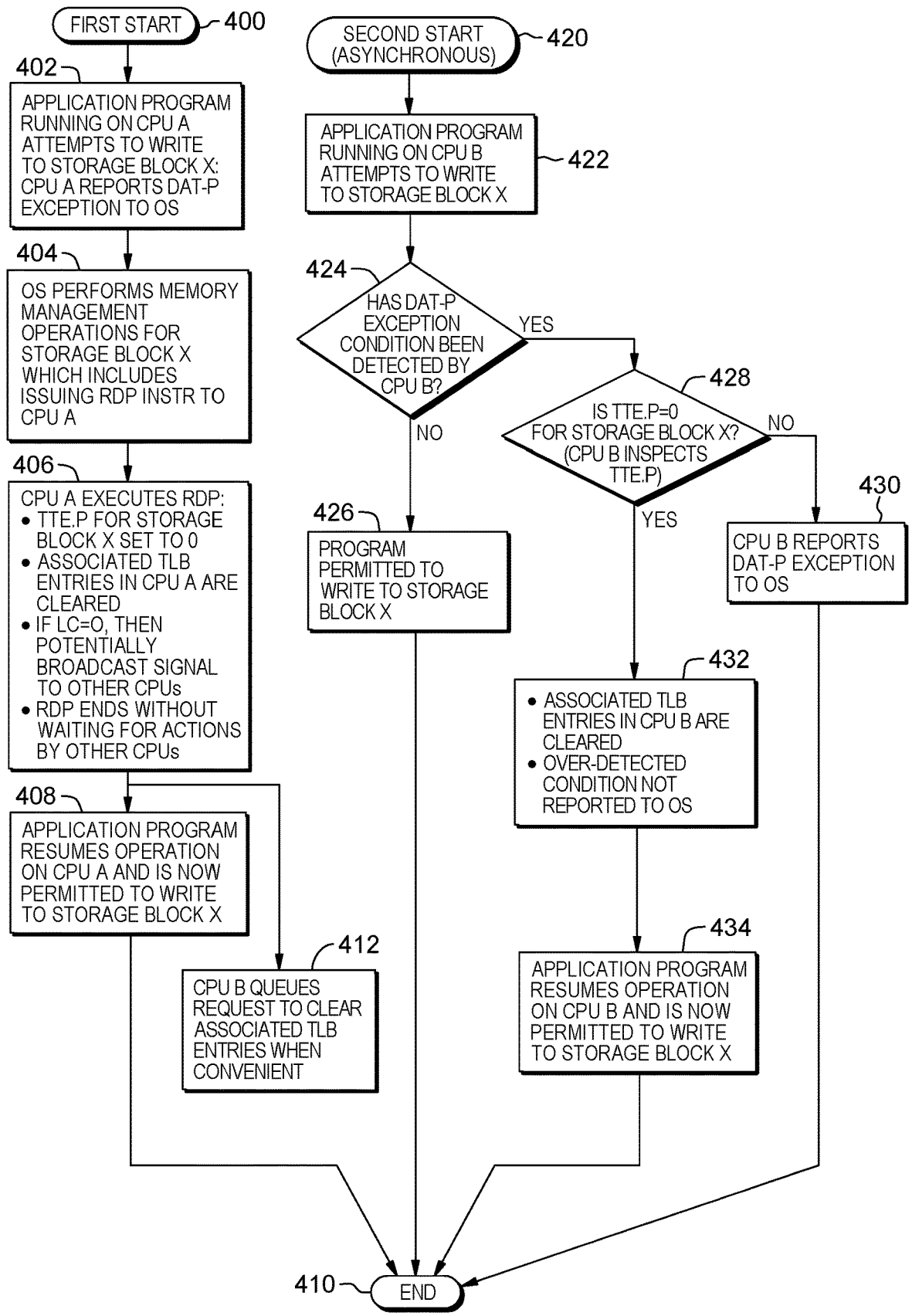
FIG. 4A depicts one embodiment of processing associated with execution of a Reset Dynamic Address Translation Protection instruction, in accordance with one or more aspects of the present invention.
Figure 4B:
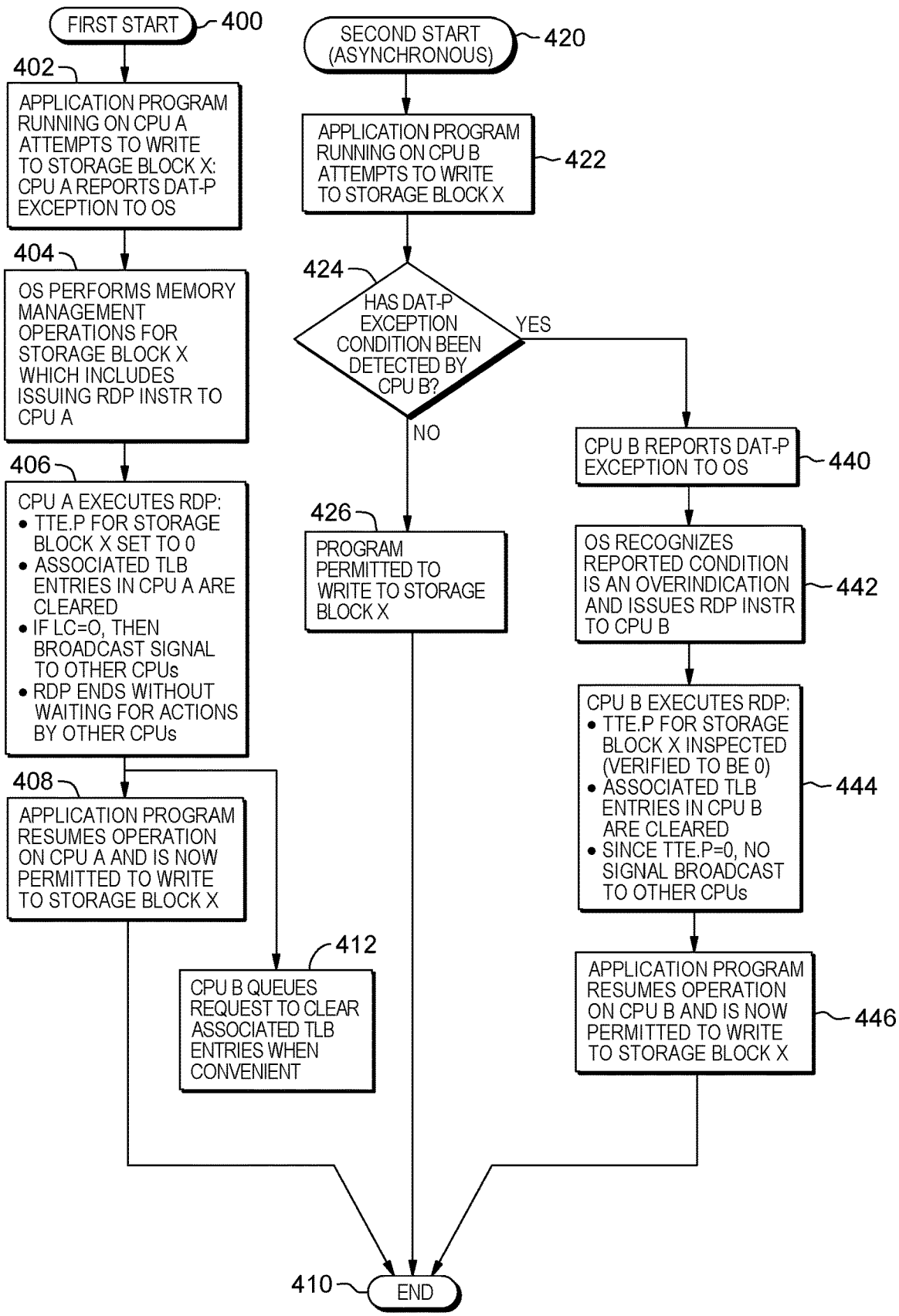
FIG. 4B depicts another embodiment of processing associated with execution of a Reset Dynamic Address Translation Protection instruction, in accordance with one or more aspects of the present invention.

By way of further example, FIGS. 4A & 4B depict different embodiments of processing based on execution of a reset dynamic address translation protection instruction, in accordance with one or more aspects of the present invention. In one example, a processor or CPU, such as a general processor or CPU 104 (FIG. 1A), is used to execute the instruction. As an example, hardware and firmware of the processor is used to execute the instruction. The hardware and firmware can be within the processor or coupled thereto for purposes of receiving the instruction from the processor, which, for instance, obtains, decodes and sets up the instruction to execute on the hardware. Other variations are also possible.

FIG. 4A depicts one example of processing associated with execution of a reset dynamic address translation protection instruction for deactivating write protection for a storage block X in a multiple-processor (i.e., multiple-CPU) computing environment or configuration. As illustrated, the process first starts 400 with an application program running on a processor (CPU A) attempting to write to storage block X, and being blocked 402. In this case, the processor (CPU A) reports an address translation protection exception (e.g., DAT-P exception) to the operating system (OS). The operating system performs memory management operations for storage block X, which include, in accordance with one or more aspects of the present invention, issuing a reset dynamic address translation protection (RDP) instruction on the processor (CPU A) 404 (in one example). The processor (CPU A) obtains (e.g., receives, fetches, etc.) the RDP instruction and executes the instruction 406.

Execution of the instruction can include, in one embodiment, testing the DAT-protect bit in the translation table entry (TTE.P), and when set to write protect, updating the translation table entry for storage block X to deactivate write protection for the storage block (e.g., TTE.P for storage block X is set to '0'). In addition, execution of the RDP instruction further clears or modifies associated translation lookaside buffer (TLB) entries in the processor (CPU A). If the local clearing control is not set (i.e., LC=0), then a signal may be broadcast to the other processors of the computing environment to clear or modify when convenient associated translation lookaside buffer entries in the other processors. In one embodiment, the signal is sent to all other processors in the computing environment. Execution of the RDP instruction is independent of any associated processing by the other processors in the computing environment, and therefore ends without waiting for any actions by other processors in the computing environment, such as without requiring a serialization or quiescing operation by one or more other processors of the computing environment. Note that serialization in the context of the description provided herein means ensuring in certain embodiments that updates to a configuration-wide resource (such as a translation table entry) are visible to all processors in the configuration before completion of the instruction.

The application program resumes operation on the processor (CPU A), and is now permitted to write to storage block X 408, which ends processing associated with the RDP instruction on the processor (CPU A) 410. Further, as illustrated in FIG. 4A, when one or more other processors (e.g., CPU B) receive the broadcast signal requesting clearing or modifying of associated TLB entries, the other processor(s) (e.g., CPU B) queues the request to clear or modify the associated TLB entries when convenient 412. Note in this regard that the TLB can have multiple levels. In one implementation, the TLB may include a level-1 TLB and a level-2 TLB. For CPU B, subsequent to receiving the request to clear or modify the associated TLB entries when convenient, the TLB entries should be, but are not required to be, cleared or modified. For instance, level-1 TLB entries need not be cleared, with the other processor relying on the associated entries aging out, and level-2 TLB entries can be cleared or modified in a background process, which requires less overhead. The particular approach for processing the broadcast signal requesting clearing or modifying of associated TLB entries is implementation-specific.

As illustrated in FIG. 4A, a second start 420, asynchronous to the first start 400, occurs when an application program running on the other processor (CPU B) attempts to write to storage block X 422. Based on this, processing determines whether the DAT-P exception condition has been detected by CPU B 424. If not, then the application program is permitted to write to storage block X 426, which completes processing 410.

In the event that the DAT-P exception condition is detected by CPU B, then processing determines whether the translation table entry protection bit (TTE.P) is zero for storage block X, based on CPU B inspecting TTE.P 428. If not, then CPU B reports the DAT-P exception to the operating system 430 for further processing.

Based on the content of the translation table entry protection bit (TTE.P) being zero, the condition is verified to be over-detected. Therefore, the associated TLB entries in CPU B are cleared or modified, and the condition is verified to be over-detected and not reported to the operating system 432. The application program resumes operation on CPU B, and is now permitted to write to storage block X 434, which completes processing 410. Note in regard to the above discussion that, if the operating system selectively utilizes the reset address translation protection instruction disclosed herein, it is anticipated that over-detection of address translation protection exceptions will be infrequent.

FIG. 4B depicts an alternate embodiment of processing associated with execution of a reset dynamic address translation protection instruction for deactivating write protection for a storage block X in a multiple-processor (i.e., multiple-CPU) computing environment or configuration. In the embodiment of FIG. 4A, a CPU implementation is presented which is capable of validating a detected condition prior to informing the operating system, and in the embodiment of FIG. 4B, it is assumed that the CPU implementation does not validate is incapable of validating detected conditions prior to informing the operating system.

As illustrated, the process first starts 400 with an application program running on a processor (CPU A) attempting to write to storage block X, and being blocked 402. In this case, the processor (CPU A) reports an address translation protection exception (e.g., DAT-P exception) to the operating system (OS). The operating system performs memory management operations for storage block X, which include, in accordance with one or more aspects of the present invention, issuing a reset dynamic address translation protection (RDP) instruction to the processor (CPU A) 404 (in one example). The processor (CPU A) obtains (e.g., receives, fetches, etc.) the RDP instruction and executes the instruction 406.

Execution of the instruction can include, in one embodiment, testing the DAT-protection bit (TTE.P), and when set to write protect, updating the translation table entry for storage block X to deactivate write protection for the storage block (e.g., TTE.P for storage block X is set to '0'). In addition, execution of the RDP instruction further clears or modifies associated translation lookaside buffer (TLB) entries in the processor (CPU A). If the local clearing control is not set (i.e., LC=0), then a signal can be broadcast to the other processors of the computing environment to clear or modify when convenient associated translation lookaside buffer entries in the other processors. In one embodiment, the signal is sent to all of the processors in the computing environment. Execution of the RDP instruction is independent of any associated processing in other processors in the computing environment, and therefore ends without waiting for any actions by other processors in the computing environment, such as requiring a serialization or quiescing operation by one or more other processors of the computing environment.

The application program resumes operation on the processor (CPU A), and is now permitted to write to storage block X 408, which ends processing associated with the RDP instruction on the processor (CPU A) 410. As illustrated in FIG. 4B, in the case where a signal is broadcast, when one or more other processors (e.g., CPU B) receive the broadcast signal requesting clearing or modifying of associated TLB entries, the other processor(s) (e.g., CPU B) queue the request to clear or modify the associated TLB entries when convenient 412.

In an asynchronous second start 420, an application program running on the other processor (CPU B) attempts to write to storage block X 422. Based on this, processing determines whether the address translation protection exception (e.g., DAT-P exception) condition has been detected by CPU B for storage block X 424. If not, then the application program is permitted to write to storage block X 426, which completes processing 410.

Where the DAT-P exception condition has been detected by CPU B, then the operating system is notified by the other processor (CPU B) of the address translation protection exception (e.g., DAT-P exception) for storage block X 440. The operating system tests the translation table entry protection bit (e.g., TTE.P) and thereby recognizes the reported condition as an over-indication, and issues another reset address translation protection instruction, this time to the other processor (CPU B) 442. This results in the other processor (CPU B) executing the reset address translation protection instruction to reset the address translation protection bit to deactivate write protection for the storage block inspected (and verified to be zero) 444. Further, associated TLB entries on that other processor (CPU B) are cleared or modified to prevent subsequent over-indication of the condition on that processor. Further, since the translation table entry protect bit (e.g., TTE.P) is verified to be '0', no signal needs to be broadcast to other processors of the computing environment. The application program on the other processor can then resume operation, and is now permitted to write to storage block X 446, which ends processing 410. Note in this regard that if the operating system selectively utilizes the reset address translation protection instruction disclosed herein, it is anticipated that over-indication of address translation protection exceptions will be infrequent.

Figure 5A:
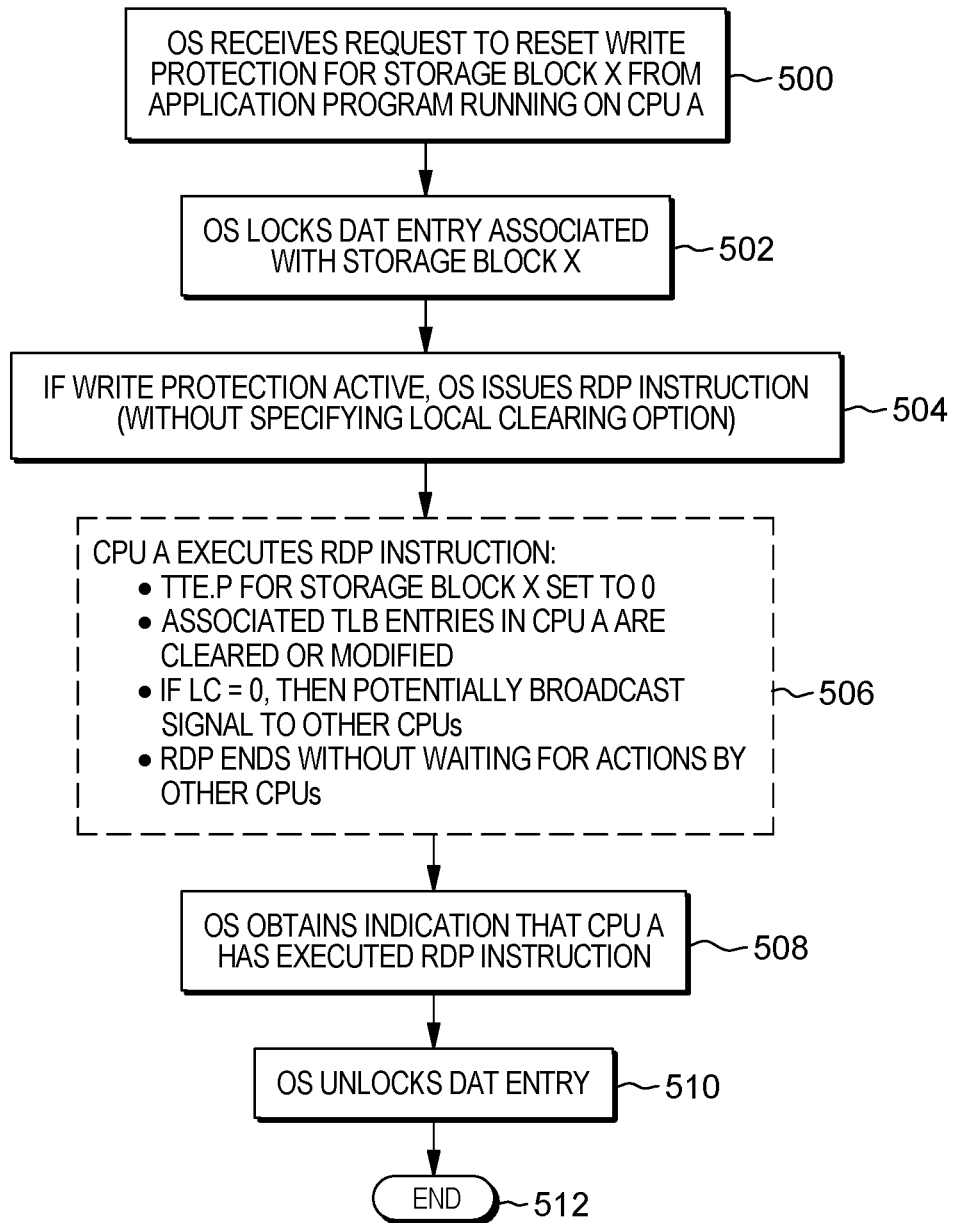
FIGS. 5A-5C depict one embodiment of a workflow illustrating certain aspects of one or more embodiments of the present invention.
Figure 5B:
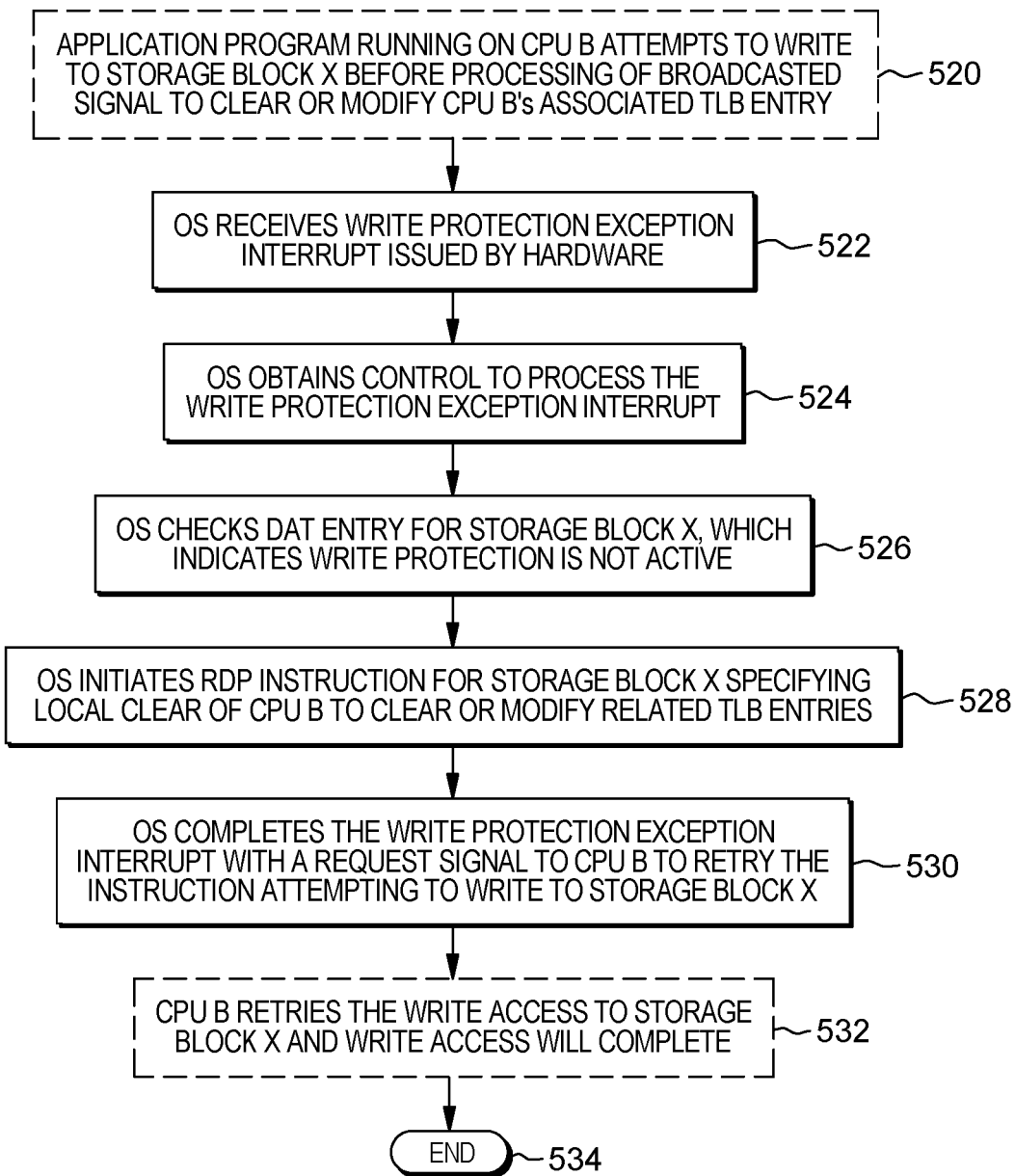
Figure 5C:
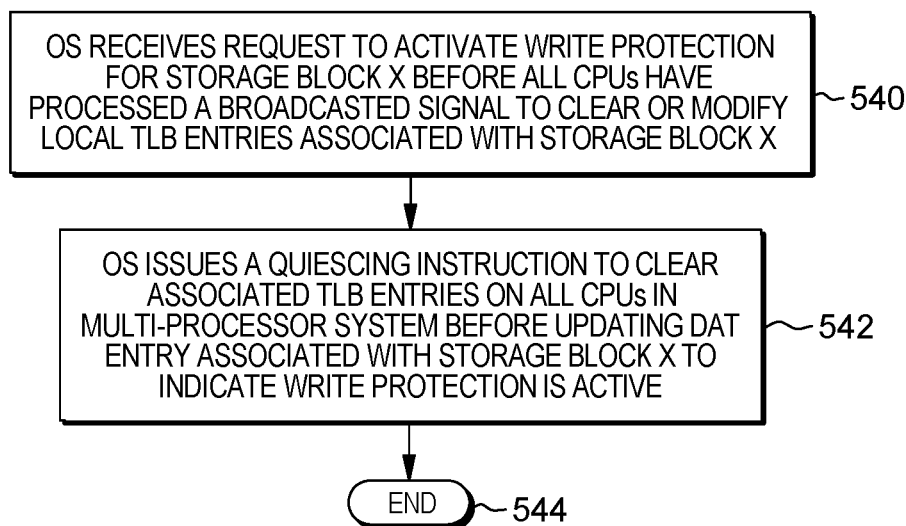

FIGS. 5A-5C depict another embodiment of a workflow illustrating certain aspects of one or more embodiments of the present invention.

Referring to FIG. 5A, an operating system receives a request to reset write protection for a storage block X from an application program running on a processor (CPU A) of a multi-processor computing environment 500. Based on receiving the request, the operating system locks the dynamic address translation (DAT) entry associated with storage block X 502, and if write protection is active, issues a reset DAT protection (RDP) instruction, without specifying local clearing 504. The processor (CPU A) obtains (e.g., receives, fetches, etc.) the RDP instruction and executes the instruction 506.

Execution of the instruction can include, in one or more embodiments, testing the DAT protection bit (TTE.P), and when set to write protect, updating the translation table entry for storage block X to deactivate write protection for the storage block (e.g., TTE.P for storage block X is set to '0'). In addition, execution of the RDP instruction further clears or modifies associated translation lookaside buffer (TLB) entries in the processor (CPU A). If the local clearing control is not set (i.e., LC=0), then a signal can be broadcast to other processors of the computing environment to also clear or modify when convenient associated translation lookaside buffer entries of the other processors. In one embodiment, the signal is sent to all other processors in the computing environment. Execution of the RDP instruction is independent of any associated processing by the other processors in the computing environment, and therefore ends without waiting for any actions by other processors in the computing environment, such as without requiring a serialization or quiescing operation by one or more other processors of the computing environment.

As illustrated in one embodiment, the operating system (OS) obtains an indication that the processor (CPU A) has executed the RDP instruction 508, and proceeds to unlock the DAT entry 510, completing processing 512.

In a multi-system or multi-processor computing environment, an application program can access the same storage block from a number of different processors (CPUs). This access can cause a TLB entry to be stored on multiple different processors. As disclosed herein, operating system services are used to activate and deactivate write protection for a storage block. Referring to FIG. 5B, in one or more implementations, an application program running on CPU B attempts to write to storage block X before processing of a received broadcast signal to clear or modify the processor's (CPU B's) associated TLB entries 520.

Based on this, the operating system receives a write protection exception interrupt issued by hardware to the operating system 522. The operating system obtains control to process the write protection exception interrupt 524, and checks the entry for the storage block, which indicates (for instance, based on the processing described above in connection with FIG. 5A) that write protection is not activated 526. The operating system performs or initiates an RDP instruction for storage block X specifying local clear for the processor (CPU B) (which attempted the write access resulting in the write protection exception interrupt) to clear or modify associated TLB entries on the processor (CPU B) 528. The operating system completes the write protection exception interrupt, with a request signal to CPU B to retry the instruction attempting to write to storage block X 530. The processor (CPU B) retries the write access to storage block X, and the write access will complete 532, which ends processing 534.

Eventually, all processors (CPUs) of the computing environment will either process the original broadcast signal, or locally clear or modify the associated TLB entry while processing a write operation exception for the storage block. As illustrated in FIG. 5C, a situation can be encountered where an application requests to activate write protection for the same storage block X, before all processors have processed a broadcasted deactivate request (e.g., based on a previous processor (CPU A) execution of the RDP instruction (see FIG. 5A)) 540. Based on this activate request, the operating system can issue a quiescing instruction to clear associated TLB entries on all processors (CPUs) in the multi-processor system before updating the DAT entry associated with storage block X to indicate write protection is active 542, which completes processing 544.

As described herein, in one aspect, an instruction (e.g., a single architected machine instruction at the hardware/software interface, e.g., a Reset Dynamic Address Translation Protection instruction) is provided to perform a reset operation. This instruction is, for instance, an instruction defined in an instruction set architecture (ISA) that determines that an address translation protection bit in a specified translation table entry associated with a storage block is to be reset, and based on the determining, resets the address translation protection bit to deactivate write protection for the storage block. The resetting is absent requiring a quiescing operation by one or more other processors of the computing environment; that is, is independent of associated processing by the one or more other processors of the computing environment. In addition, the resetting can be without broadcasting the operation to other processors in the system. The complexity of processing related to performing a reset operation is thus reduced. Further, performance of the reset operation, and thus, the processor, is improved. The instruction execution reduces execution times and improves performance, and further frees up system-wide quiescing resources for use by other processors.

One or more aspects of the present invention are inextricably tied to computer technology and facilitate processing within a computer, improving performance thereof. The use of a single architected machine instruction to perform reset-related operations improves performance within the computing environment by reducing complexity, reducing use of resources and increasing processing speed. The instruction may be used in many technical fields, such as in computer processing, medical processing, engineering, automotive technologies, manufacturing, etc. By providing optimizations for resetting write access to a storage block, these technical fields are improved by reducing execution time.

Further details of one embodiment of facilitating processing within a computing environment, as it relates to one or more aspects of the present invention, are described with reference to FIGS. 6A-6B.

Referring to FIG. 6A, in one embodiment, an instruction is executed to perform a reset operation 600. The executing the instruction includes, for instance, determining, by a processor, that an address translation protection bit in a specified translation table entry associated with a storage block is to be reset 602, and based on the determining, resetting the address translation protection bit to deactivate write protection for the storage block, where the resetting is absent waiting for an action by one or more other processors of the computing environment 604. By resetting without requiring a quiescing operation by one or more other processors of the computing environment (i.e., independent of associated processing of the one or more other processors of the computing environment), performance is enhanced by reducing suspension of instruction processing within the computing environment. Further, by using the RDP instruction to perform, at least, the determining and the resetting operations, performance is improved, and utilization of resources is reduced.

In one example, the executing the instruction includes ending executing of the instruction based on resetting the address translation protection bit to deactivate write protection for the storage block absent requiring a quiescing operation by one or more other processors of the computing environment 606. Ending execution of the instruction without requiring quiescing operation by one or more other processors of the computing environment advantageously results in improved performance of the computing environment, and frees up system-wide quiescing resources for use by other processors.

In one embodiment, executing the instruction further includes clearing any translation lookaside buffer entries in the processor associated with the specified translation table entry 608. In another example, executing the instruction further includes resetting protection indication in any translation lookaside buffer entries in the processor associated with the specified translation table entry 610. Advantageously, rather than clearing the translation lookaside buffer entries, the processor can simply reset the protection indication in the entries, while leaving the remainder of the entries intact. This allows writes to continue to complete without requiring retranslation of the address to reconstruct the required translation lookaside buffer entry.

In one embodiment, executing the instruction further includes broadcasting a signal to one or more other processors of the computing environment to clear or modify translation lookaside buffer entries in the one or more other processors associated with the specified translation table entry 612. In one embodiment, executing the instruction further includes testing the address translation protection bit in the specified translation table entry associated with the storage block, where the broadcasting is based, at least in part, on a result of the testing 614. By using the reset address translation protection instruction to perform the determining, resetting and broadcasting operations, performance is improved, and utilization to resources to reduced.

Referring to FIG. 6B, in one example, another processor of the one or more other processors attempts a write access to the storage block without the other processor's associated translation lookaside buffer entries having been cleared or modified, resulting in an over-detection of an address translation protection exception condition, and based thereon, the other processor inspects the address translation protection bit to identify that the address translation protection exception condition is an over-detection, and based on the inspection identifying that the address translation protection exception condition is the over-detection, write access to the storage block is permitted 616. Inspecting the address translation protection bit to identify that the address translation protection exception condition is an over-indication advantageously improves processing performance in this situation by allowing access, and avoiding a need for the program interrupt handler of the operating system.

In a further example, another processor of the one or more other processors attempts a write access to the storage block without the other processor's associated translation lookaside buffer entries having been cleared or modified, resulting in an address translation protection exception condition, and based thereon, the other processor inspects the address translation protection bit to identify that the address translation protection exception condition is an over-indication, and based on the inspection identifying that the address translation protection exception condition is the over-indication, the other processor clears or modifies the associated translation lookaside buffer of entries containing the over-indicated address translation protection bit 618. Advantageously, inspecting the address translation protection bit to identify that the address translation protection exception condition is an over-indication improves processing performance in this situation by allowing the write access to proceed.

In one example, where another processor of the one or more other processors attempts a write access to the storage block without the other processor's associated translation lookaside buffer entries having been cleared or modified, resulting in an over-detected address translation protection exception condition, the other processor reports the exception condition to an operating system of the computing environment, based on which the operating system issues to the other processor the instruction to perform the reset address translation protection operation at the other processor of the one or more other processors 620. Advantageously, the instruction to perform the reset address translation protection operation provides an option for the operating system to facilitate deactivating write protection for the storage block without requiring a quiescing operation among all processors of the computing environment responsive to the change.

Other variations and embodiments are possible. For instance, in one or more other implementations, the translation protection indication can be reset in existing TLB entries, rather than clearing the entries and requiring them to be reconstructed.

Figure 7A:
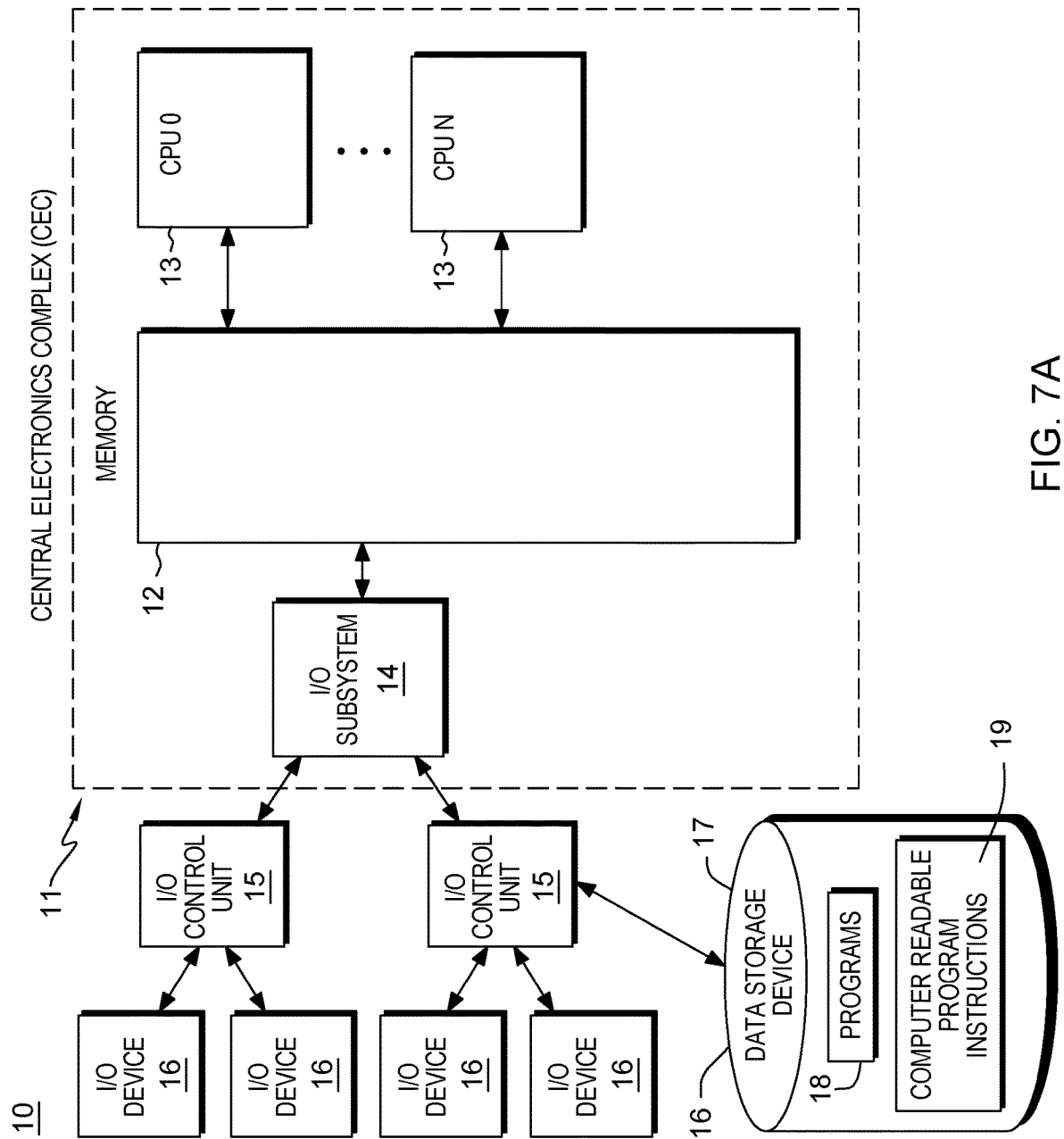
FIG. 7A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 7A. As an example, the computing environment of FIG. 7A is based on the z/Architecture® instruction set architecture offered by International Business Machines Corporation, Armonk, New York. The z/Architecture hardware architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 7C:
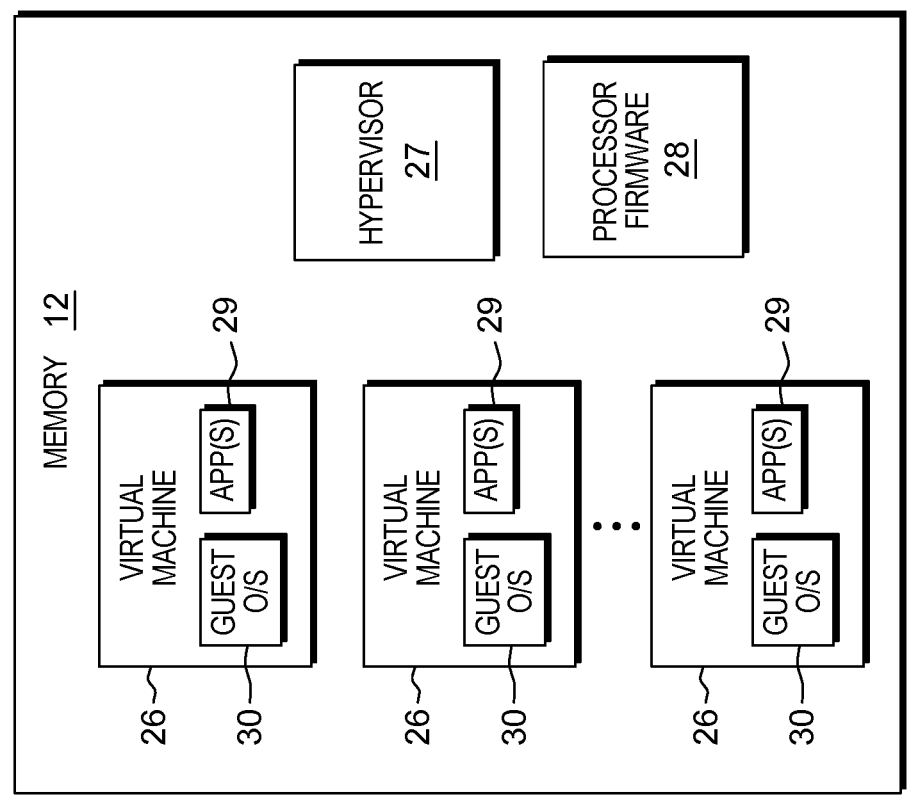
FIG. 7C depicts another example of further details of a memory for the computing environment of FIG. 7A, in accordance with one or more aspects of the present invention.
Figure 7B:
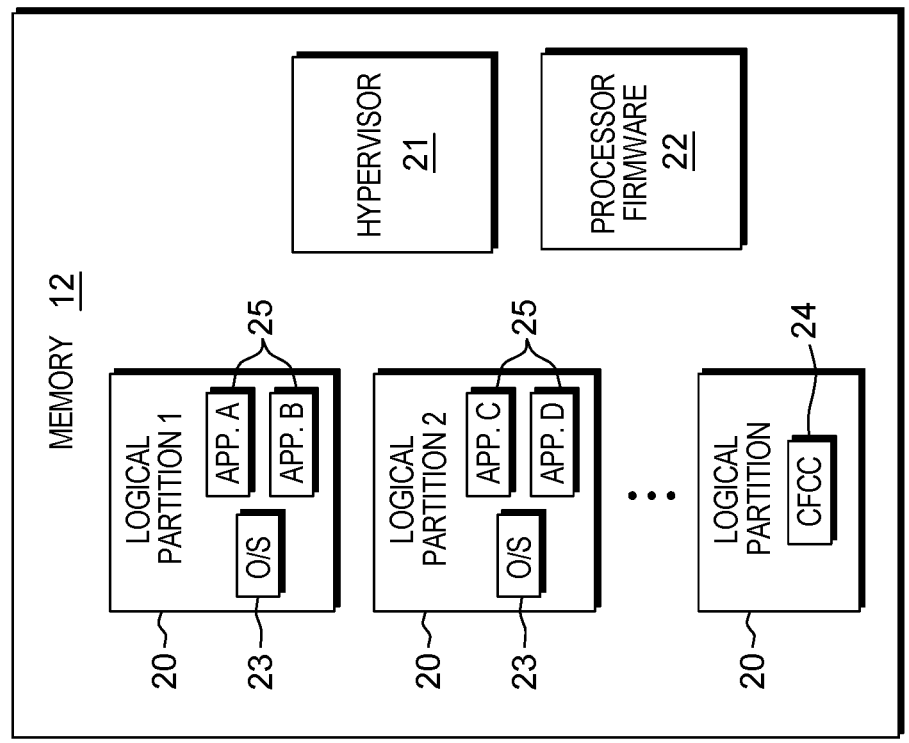
FIG. 7B depicts one example of further details of a memory for the computing environment of FIG. 7A, in accordance with one or more aspects of the present invention.

Central electronics complex 11 provides in one or more embodiments logical partitioning and/or virtualization support. In one embodiment, as shown in FIG. 7B, memory 12 includes, for example, one or more logical partitions 20, a hypervisor 21 that manages the logical partitions, and processor firmware 22. One example of hypervisor 21 is the Processor Resource/System Manager (PR/SM™), offered by International Business Machines Corporation, Armonk, New York. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, New York, or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 7A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 7C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 8A:
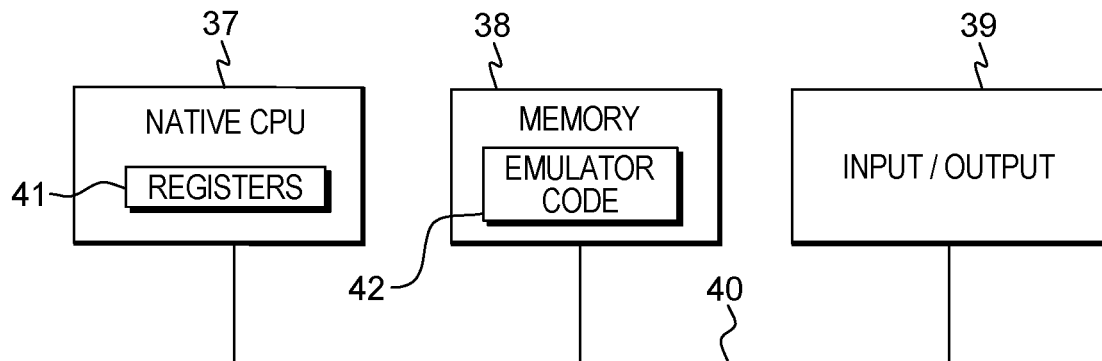
FIG. 8A depicts yet another example of a computing environment to incorporate and use one or more aspects of the present invention.

Another embodiment of a computing environment to incorporate and use one or more aspects of the present invention is described with reference to FIG. 8A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 8B:
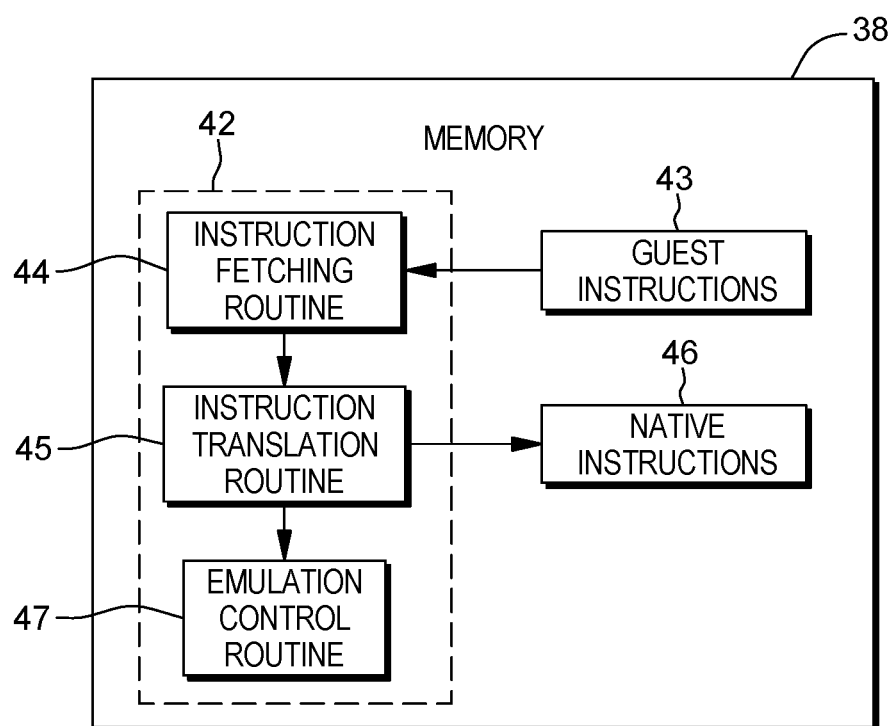
FIG. 8B depicts further details of the memory of FIG. 8A, in accordance with one or more aspects of the present invention.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

One instruction that may be emulated is the Reset Dynamic Address Translation Protection instruction described herein, in accordance with an aspect of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
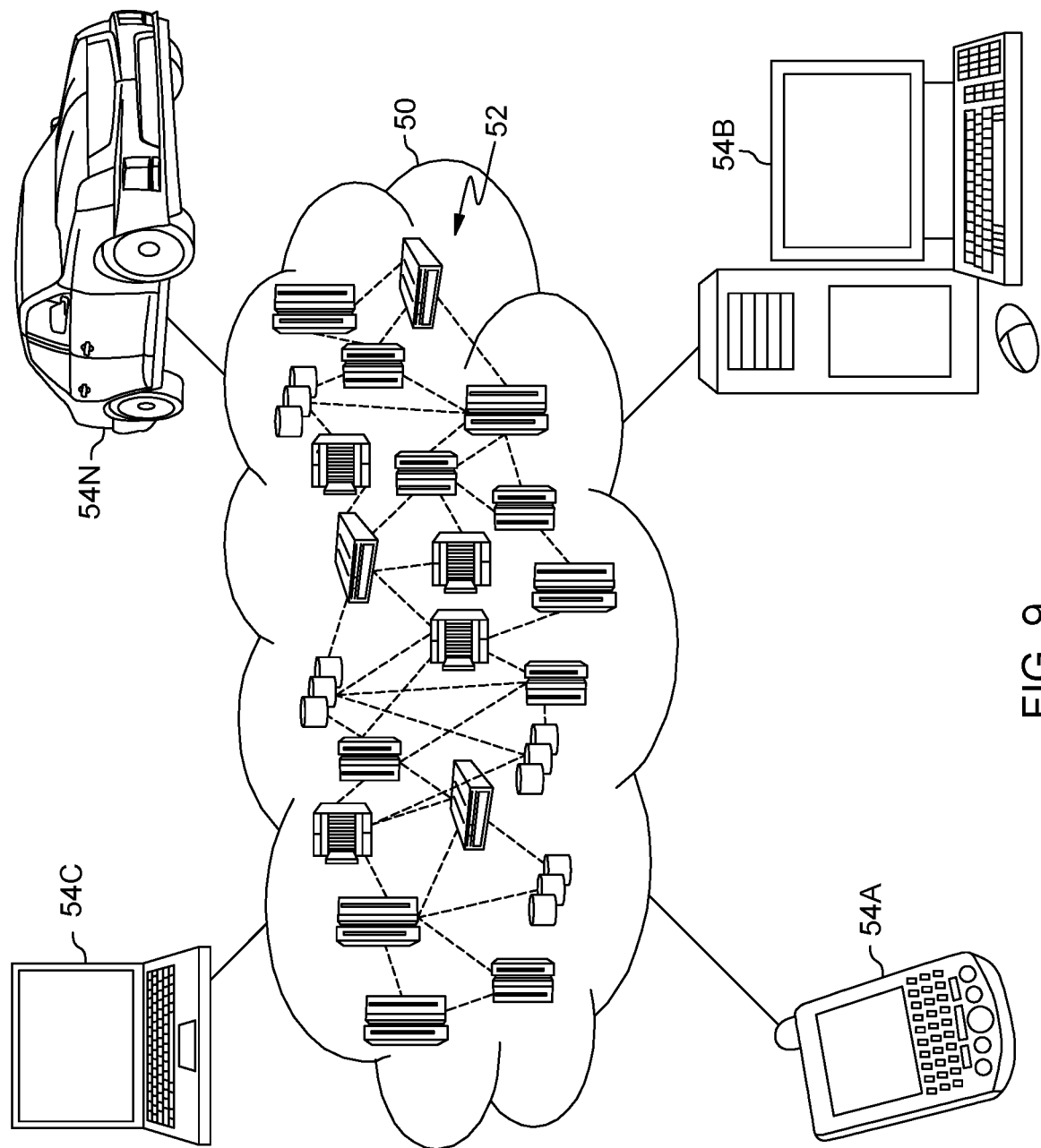
FIG. 9 depicts one embodiment of a cloud computing environment, in accordance with one or more aspects of the present invention.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 52 and cloud computing environment 50 can communicate with any type of computerized device over any type of network and/or network addressable connection (e.g., using a web browser).

Figure 10:
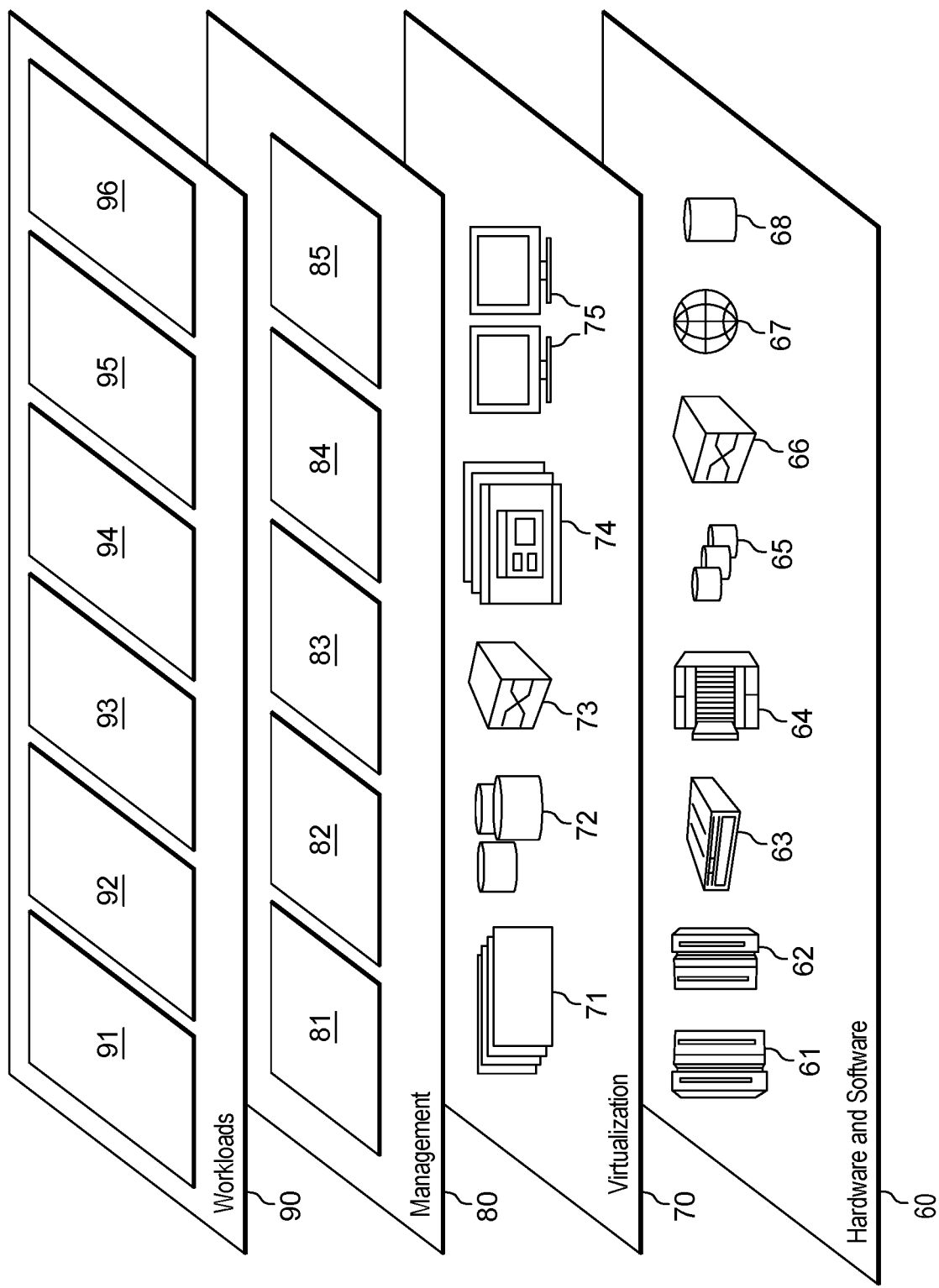
FIG. 10 depicts one example of abstraction model layers, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reset processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

at least one computer-readable storage medium having program instructions embodied therewith, the program instructions being readable by a processor to cause the processor to perform a method comprising:

receiving, at the processor, from an operating system of the computing environment a reset dynamic address translation protection instruction with an operation code field indicating a reset address translation protection operation is to be performed, the reset dynamic address translation protection instruction being part of an instruction set architecture, and being a single instruction issued by the operating system, and being received, by the processor, based on an application executing on the processor encountering an address translation protection bit exception due to a write access to a storage block being blocked by an address translation protection bit in a specified translation table entry associated with the storage block, the translation table entry being in a translation lookaside buffer cache at the processor;

executing the reset dynamic address translation protection instruction, by the processor, to perform the reset address translation protection operation, the executing the reset dynamic address translation protection instruction comprising:

determining, by the processor, that the address translation protection bit in the specified translation table entry associated with the storage block in the translation lookaside buffer cache at the processor is to be reset;

based on the determining, resetting the address translation protection bit to deactivate write protection for the storage block, the resetting being regardless of any associated action by one or more other processors of the computing environment;

clearing any translation lookaside buffer entries in the processor associated with the specified translation table entry; and wherein the determining, resetting and clearing are performed as part of executing the single reset dynamic address translation protection instruction.

2. The computer program product of claim 1, wherein executing the instruction further comprises ending executing of the instruction based on resetting the address translation protection bit to deactivate write protection for the storage block without requiring a quiescing operation by the one or more other processors of the computing environment.

3. The computer program product of claim 1, wherein executing the instruction further comprises resetting protection indication in any translation lookaside buffer entries in the processor associated with the specified translation table entry.

4. The computer program product of claim 1, wherein executing the instruction further comprises broadcasting a signal to one or more other processors of the computing environment to adjust translation lookaside buffer entries in the one or more other processors associated with the specified translation table entry, and wherein the determining, resetting, clearing and broadcasting are performed as part of executing the single reset dynamic address translation protection instruction.

5. The computer program product of claim 4, wherein executing the instruction further comprises testing the address translation protection bit in the specified translation table entry associated with the storage block, and wherein the broadcasting is based, at least in part, on a result of the testing.

6. The computer program product of claim 5, wherein one processor of the one or more other processors attempts a write access to the storage block without the one processor's associated translation lookaside buffer entries having been adjusted, resulting in an address translation protection exception condition, and based thereon, reports the exception condition to the operating system of the computing environment, based on which the operating system issues to the one processor the instruction to perform the reset address translation protection operation at the one processor of the one or more other processors.

7. The computer program product of claim 4, wherein one processor of the one or more other processors attempts a write access to the storage block without the one processor's associated translation lookaside buffer entries having been adjusted, resulting in an address translation protection exception condition, and based thereon, the one processor inspects the address translation protection bit to identify that the address translation protection exception condition is an over-indication, and based on the inspection identifying that the address translation protection exception condition is the over-indication, write access to the storage block is permitted.

8. The computer program product of claim 4, wherein one processor of the one or more other processors attempts a write access to the storage block without the one processor's associated translation lookaside buffer entries having been adjusted, resulting in an address translation protection exception condition, and based thereon, the one processor inspects the address translation protection bit to identify that the address translation protection exception condition is an over-indication, and based on the inspection identifying that the address translation protection exception condition is the over-indication, the one processor adjusts its associated translation lookaside buffer of entries containing the over-indicated address translation protection bit.

9. A computer system for facilitating processing within a computing environment, the computer system comprising:
   a memory; and
   a processor in communication with the memory, wherein the computer system is configured to perform a method, the method comprising:
      receiving, at the processor, from an operating system of the computing environment a reset dynamic address translation protection instruction with an operation code field indicating a reset address translation protection operation is to be performed, the reset dynamic address translation protection instruction being part of an instruction set architecture, and being a single instruction issued by the operating system, and being received, by the processor, based on an application executing on the processor encountering an address translation protection bit exception due to a write access to a storage block being blocked by an address translation protection bit in a specified translation table entry associated with the storage block, the translation table entry being in a translation lookaside buffer cache at the processor;
      executing the reset dynamic address translation protection instruction, by the processor, to perform the reset address translation protection operation, the executing the reset dynamic address translation protection instruction comprising:
         determining, by the processor, that the address translation protection bit in the specified translation table entry associated with the storage block in the translation lookaside buffer cache at the processor is to be reset;
         based on the determining, resetting the address translation protection bit to deactivate write protection for the storage block, the resetting being regardless of any associated action by one or more other processors of the computing environment;
         clearing any translation lookaside buffer entries in the processor associated with the specified translation table entry; and
         wherein the determining, resetting and clearing are performed as part of executing the single reset dynamic address translation protection instruction.

10. The computer system of claim 9, wherein executing the instruction further comprises ending executing of the instruction based on resetting the address translation protection bit to deactivate write protection for the storage block without requiring a quiescing operation by the one or more other processors of the computing environment.

11. The computer system of claim 9, wherein executing the instruction further comprises resetting protection indication in any translation lookaside buffer entries in the processor associated with the specified translation table entry.

12. The computer system of claim 9, wherein executing the instruction further comprises broadcasting a signal to one or more other processors of the computing environment to adjust translation lookaside buffer entries in the one or more other processors associated with the specified translation table entry, and wherein the determining, resetting, clearing and broadcasting are performed as part of executing the single reset dynamic address translation protection instruction.

13. The computer system of claim 12, wherein executing the instruction further comprises testing the address translation protection bit in the specified translation table entry associated with the storage block, and wherein the broadcasting is based, at least in part, on a result of the testing.

14. A computer-implemented method of facilitating processing within a computing environment, the computer-implemented method comprising:
   receiving, at a processor, from an operating system of the computing environment a reset dynamic address translation protection instruction with an operation code field indicating a reset address translation protection operation is to be performed, the reset dynamic address translation protection instruction being part of an instruction set architecture, and being a single instruction issued by the operating system, and being received, by the processor, based on an application executing on the processor encountering an address translation protection bit exception due to a write access to a storage block being blocked by an address translation protection bit in a specified translation table entry associated with the storage block, the translation table entry being in a translation lookaside buffer cache at the processor;
executing the reset dynamic address translation protection instruction, by the processor, to perform the reset address translation protection operation, the executing the reset dynamic address translation protection instruction comprising:
- determining, by the processor, that the address translation protection bit in the specified translation table entry associated with the storage block in the translation lookaside buffer cache at the processor is to be reset;
- based on the determining, resetting the address translation protection bit to deactivate write protection for the storage block, the resetting being regardless of any associated action by one or more other processors of the computing environment;
- clearing any translation lookaside buffer entries in the processor associated with the specified translation table entry; and
- wherein the determining, resetting and clearing are performed as part of executing the single reset dynamic address translation protection instruction.

15. The computer-implemented method of claim 14, wherein executing the instruction further comprises ending executing of the instruction based on resetting the address translation protection bit to deactivate write protection for the storage block without requiring a quiescing operation by the one or more other processors of the computing environment.

16. The computer-implemented method of claim 14, wherein executing the instruction further comprises resetting protection indication in any translation lookaside buffer entries in the processor associated with the specified translation table entry.

17. The computer-implemented method of claim 14, wherein executing the instruction further comprises broadcasting a signal to one or more other processors of the computing environment to adjust translation lookaside buffer entries in the one or more other processors associated with the specified translation table entry, and wherein the determining, resetting, clearing and broadcasting are performed as part of executing the single reset dynamic address translation protection instruction.

18. A computer program product for facilitating processing within a computing environment, the computer program product comprising:
at least one computer-readable storage medium having program instructions embodied therewith, the program instructions being readable by a processor to cause the processor to perform a method comprising:
- receiving, at the processor, from an operating system of the computing environment a reset dynamic address translation protection instruction to perform a reset address translation protection operation, the reset dynamic address translation protection instruction being part of an instruction set architecture, and being a single instruction issued by the operating system, and being received, by the processor, based on an application executing on the processor encountering an address translation protection bit exception due to a write access to a storage block being blocked by an address translation protection bit in a specified translation table entry associated with the storage block, the translation table entry being in a translation lookaside buffer cache at the processor;
- executing the reset dynamic address translation protection instruction, by the processor, to perform the reset address translation protection operation, the executing the reset dynamic address translation protection instruction comprising:
  - determining, by the processor, that the address translation protection bit in the specified translation table entry associated with the storage block in the translation lookaside buffer cache at the processor is to be reset by the processor; and
  - based on the determining, resetting the address translation protection bit to deactivate write protection for the storage block, the resetting being regardless of any associated action by one or more other processors of the computing environment;
  - broadcasting a signal to one or more other processors of the computing environment to adjust translation lookaside buffer entries in the one or more other processors associated with the specified translation table entry, wherein one other processor of the one or more other processors initiates a write access to the storage block without the one processor's associated translation lookaside buffer entries having been adjusted, resulting in an address translation protection exception condition, and based thereon, the one other processor assists in resolution of the address translation protection exception condition at the one other processor of the one or more other processors; and
  - wherein the determining, resetting and broadcasting are performed as part of executing the single reset dynamic address translation protection instruction.

19. The computer program product of claim 18, wherein based on the address translation protection exception condition, the one processor inspects the address translation protection bit to identify that the address translation protection exception condition is an over-indication, and based on the inspection identifying that the address translation protection exception condition is the over-indication, write access to the storage block is permitted.

20. The computer program product of claim 18, wherein based on the address translation protection exception condition, the one processor inspects the address translation protection bit to identify that the address translation protection exception condition is an over-indication, and based on the inspection identifying that the address translation protection exception condition is the over-indication, the one processor adjusts its associated translation lookaside buffer entries containing the over-indicated address translation protection bit.

21. The computer program product of claim 18, wherein executing the instruction further comprises testing the address translation protection bit in the specified translation table entry associated with the storage block, and wherein the broadcasting is based, at least in part, on a result of the testing.

22. The computer program product of claim 18, wherein based on the address translation protection exception condition, the one processor reports the exception condition to the operating system of the computing environment, based on which the operating system issues to the one processor the instruction to perform the reset address translation protection operation at the one processor of the one or more other processors.

* * * * *